United States Patent
Sworen et al.

(10) Patent No.: US 10,138,392 B2
(45) Date of Patent: *Nov. 27, 2018

(54) NON-FLUORINATED URETHANE BASED COATINGS

(71) Applicant: THE CHEMOURS COMPANY FC LLC, Wilmington, DE (US)

(72) Inventors: John Christopher Sworen, Chadds Ford, PA (US); Gerald Oronde Brown, Wilmington, DE (US); Mario Vincenzini, Coatesville, PA (US); Flemming Vang Sparsoe, Skanderborg (DK)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 650 days.

This patent is subject to a terminal disclaimer.

(21) Appl. No.: 14/226,892

(22) Filed: Mar. 27, 2014

(65) Prior Publication Data

US 2014/0295724 A1    Oct. 2, 2014

Related U.S. Application Data

(60) Provisional application No. 61/806,465, filed on Mar. 29, 2013.

(51) Int. Cl.

| | |
|---|---|
| C08G 18/00 | (2006.01) |
| C09D 175/08 | (2006.01) |
| C09D 175/06 | (2006.01) |
| C08G 18/70 | (2006.01) |
| C08G 18/73 | (2006.01) |
| C08G 18/75 | (2006.01) |
| C08G 18/78 | (2006.01) |
| C08G 18/79 | (2006.01) |
| C08G 18/28 | (2006.01) |
| C08G 18/32 | (2006.01) |
| C08G 18/36 | (2006.01) |
| D06M 15/564 | (2006.01) |
| D06M 15/568 | (2006.01) |
| D06M 15/572 | (2006.01) |

(52) U.S. Cl.
CPC ......... *C09D 175/08* (2013.01); *C08G 18/281* (2013.01); *C08G 18/283* (2013.01); *C08G 18/284* (2013.01); *C08G 18/3221* (2013.01); *C08G 18/36* (2013.01); *C08G 18/706* (2013.01); *C08G 18/73* (2013.01); *C08G 18/755* (2013.01); *C08G 18/7831* (2013.01); *C08G 18/792* (2013.01); *C09D 175/06* (2013.01); *D06M 15/564* (2013.01); *D06M 15/568* (2013.01); *D06M 15/572* (2013.01); *Y10T 442/2164* (2015.04)

(58) Field of Classification Search
CPC .. C08G 18/281; C08G 18/283; C08G 18/284; C08G 18/3221; C08G 18/36; C08G 18/706; C08G 18/73; C08G 18/18755; C08G 18/792; C09D 175/08; C09D 175/06

See application file for complete search history.

(56) References Cited

U.S. PATENT DOCUMENTS

| | | |
|---|---|---|
| 3,049,513 A | 8/1962 | Damusis |
| 3,505,001 A | 4/1970 | Wagner |

(Continued)

FOREIGN PATENT DOCUMENTS

| | | |
|---|---|---|
| CN | 101914185 A | 12/2010 |
| EP | 2415879 | 8/2010 |

(Continued)

OTHER PUBLICATIONS

International Search Report and Written Opinion, PCT/US2014/032095, dated Sep. 9, 2014.

Mao et al., Effect of additives on microstructure and properties of polyurethane coating film for fabrics, Fangzhi Xuebao (1996), 17(2), 4-7 (Abstract Attached).

*Primary Examiner* — Michael L Leonard

(57) ABSTRACT

A compound for imparting water repellency and optionally stain release to substrates wherein the compound is prepared by (i) reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic):

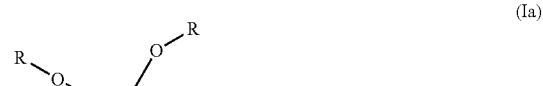

(Ia)

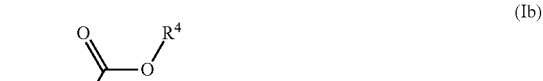

(Ib)

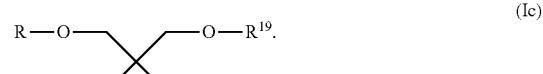

(Ic)

17 Claims, No Drawings

(56) References Cited

U.S. PATENT DOCUMENTS

| | | | |
|---|---|---|---|
| 4,304,683 A | 12/1981 | Morinaka et al. | |
| 4,360,447 A | 11/1982 | Morinaka et al. | |
| 4,388,372 A | 6/1983 | Champaneria | |
| 6,864,312 B2 * | 3/2005 | Moore | C08G 18/0828 524/591 |
| 7,344,758 B2 | 3/2008 | Franchina et al. | |
| 8,349,986 B2 | 1/2013 | Rukavina et al. | |
| 8,586,697 B2 | 11/2013 | Elizalde et al. | |
| 2003/0120101 A1 | 6/2003 | Lai | |
| 2005/0085573 A1 | 4/2005 | Sandner et al. | |
| 2006/0052556 A1 | 3/2006 | Franchina et al. | |
| 2006/0151739 A1 | 7/2006 | Sandner et al. | |
| 2007/0009663 A1 | 1/2007 | Wang et al. | |
| 2007/0167601 A1 | 7/2007 | Rukavina et al. | |
| 2008/0146750 A1 | 6/2008 | Corn et al. | |
| 2010/0124649 A1 | 5/2010 | Rukavina et al. | |
| 2010/0190397 A1 | 7/2010 | Duschek et al. | |
| 2013/0288066 A1 | 10/2013 | Reiners et al. | |
| 2014/0031483 A1 | 1/2014 | Elizalde et al. | |
| 2016/0090392 A1 | 3/2016 | Sworen et al. | |
| 2016/0090438 A1 | 3/2016 | Sworen et al. | |
| 2016/0090505 A1 | 3/2016 | Sworen et al. | |
| 2016/0090508 A1 | 3/2016 | Sworen et al. | |
| 2016/0090509 A1 | 3/2016 | Sworen et al. | |
| 2016/0090560 A1 | 3/2016 | Sworen et al. | |
| 2016/0090686 A1 | 3/2016 | Sworen et al. | |
| 2016/0090687 A1 | 3/2016 | Sworen et al. | |
| 2016/0090688 A1 | 3/2016 | Sworen et al. | |

FOREIGN PATENT DOCUMENTS

| | | |
|---|---|---|
| GB | 887387 | 1/1962 |
| GB | 1360007 | 7/1974 |
| JP | 1972003477 B | 1/1972 |
| JP | 1973004940 | 1/1973 |
| JP | 1983079008 | 5/1983 |
| JP | 1985045678 B2 | 10/1985 |
| JP | 05331130 A | 12/1993 |
| KR | 2009002894 A1 | 1/2009 |
| WO | 200037525 A1 | 6/2000 |
| WO | 2003089477 A1 | 10/2003 |
| WO | 2006024669 A1 | 3/2006 |
| WO | 200640333 A1 | 4/2006 |
| WO | 2009015136 A1 | 1/2009 |
| WO | 2011124710 A | 10/2011 |

* cited by examiner

NON-FLUORINATED URETHANE BASED COATINGS

FIELD OF INVENTION

This invention relates to a composition comprising an organic urethane compound useful for imparting durable water repellency and optionally stain release to textiles, the compound derived from isocyanates and bio-based organic compounds such as sorbitans, citrates, and pentaerythriols.

BACKGROUND OF THE INVENTION

Various compositions are known to be useful as treating agents to provide water repellency and optionally stain release to textile substrates. Many such treating agents are fluorinated polymers and copolymers, or non-fluorinated polymers and copolymers. Non-fluorinated compounds are predominately polyacrylate-based or urethane-based copolymers.

Fluorinated copolymers provide good repellency to water and oil. Various attempts have been made to produce a non-fluorinated water repellent. Non-fluorinated copolymers are known to provide water repellency and optionally stain release to textiles, but are less effective than the fluorinated counterparts.

Moore, in U.S. Pat. No. 6,864,312, discloses a polyurethane polymer that provides moisture resistance. Moore claims polyurethane polymer particle dispersions, where the polyurethane polymers are isocyanate-terminated prepolymers prepared from a formulation including a polyisocyanate and a polyol.

SUMMARY OF INVENTION

The need exists for non-fluorinated compounds that provide water repellency and optionally stain release for textiles, with performance results comparable to fluorinated treating agents. Also desirable is a non-fluorinated compound that can be bio-based derived. The present invention meets these needs.

The present invention comprises a non-fluorinated organic urethane compound useful for imparting durable water repellency and optionally stain release to textiles, the copolymer derived from bio-based organic sorbitans and isocyanates. These non-fluorinated urethanes provide increased durable water repellency and optionally stain release to textiles and are comparable to several fluorinated water repellent compounds.

The present invention comprises a compound for imparting water repellency and optionally stain release to substrates wherein the compound is prepared by the process comprising:
(i) reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic):

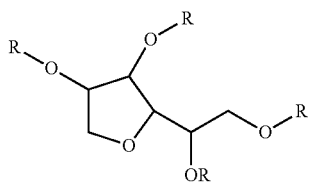

(Ia)

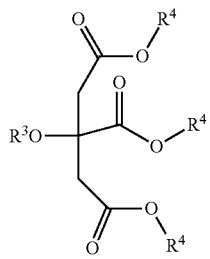

(Ib)

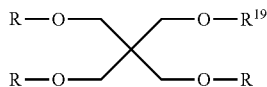

(Ic)

wherein each R is independently a —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;

each n is independently 0 to 20;
each m is independently 0 to 20;
m+n is greater than 0;
each R$^1$ is independently a linear or branched alkyl group having 5 to 29 carbons optionally comprising at least 1 unsaturated bond;
each R$^2$ is independently —H, or a linear or branched alkyl group having 6 to 30 carbons optionally comprising at least 1 unsaturated bond;
or a mixtures thereof,
provided that when the compound is of Formula (Ia) then at least one of R or R$^2$ is —H;
each R$^3$ is independently a —H; —R$^1$; —C(O)R$^1$; —(CH$_2$CH$_2$O)$_n$(CH(CH$_3$)CH$_2$O)$_m$R$^2$;
or —(CH$_2$CH$_2$O)$_n$(CH(CH$_3$)CH$_2$O)$_m$C(O)R$^1$;
each R$^4$ is independently —H, a linear or branched alkyl group having 6 to 30 carbons optionally comprising at least 1 unsaturated bond, or combinations thereof; —(CH$_2$CH$_2$O)$_n$ (CH(CH$_3$)CH$_2$O)$_m$R$^2$;
or —(CH$_2$CH$_2$O)$_n$(CH(CH$_3$)CH$_2$O)$_m$C(O)R$^1$;
each n' is independently 0 to 20;
each m' is independently 0 to 20;
m'+n' is greater than 0;
provided when the compound is Formula (Ib), then at least one R$^2$, R$^3$ or R$^4$ is a —H; and
each R$^{19}$ is —H, —C(O)R$^1$, or —CH$_2$C[CH$_2$OR]$_3$,
provided when the compound is Formula (Ic), then at least one R$^{19}$ or R is —H.

The compound may further comprise additional reactants such as a second organic compound and/or water. Water can be used to cross-link unreacted isocyanates to create urea linkages.

In a second embodiment, the present invention is a method of preparing a composition comprising: (i) reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic).

In a third embodiment, the present invention is a method of treating a fibrous substrate comprising applying to the surface of the substrate a non-fluorinated organic urethane as described above.

In a fourth embodiment, the present invention is a fibrous substrate having applied to its surface a compound or composition as disclosed above.

In a fifth embodiment, the present invention is a composition for imparting water repellency and optionally stain release to substrates comprising an aqueous solution or dispersion of at least one non-fluorinated organic urethane compound described above.

DETAILED DESCRIPTION OF INVENTION

Herein all trademarks are designated with capital letters.

The present invention provides a compound for imparting water repellency and optionally stain release to fibrous substrates. The resulting compounds provide enhanced performance and durability of water repellency to treated substrates compared to traditional non-fluorinated commercially available treatment agents. The starting materials of the present invention can be derived from bio-source materials.

The present invention comprises a compound for imparting water repellency and optionally stain release to substrates wherein the compound is prepared by the process comprising:

(i) reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic):

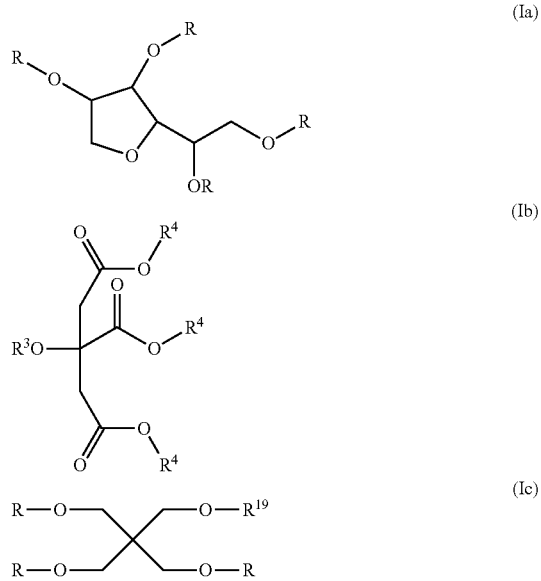

wherein each R is independently a —H; —$R^1$; —C(O)$R^1$; —($CH_2CH_2O)_n$($CH(CH_3)CH_2O)_m R^2$;
or —($CH_2CH_2O)_n$($CH(CH_3)CH_2O)_m C(O)R^1$;
  each n is independently 0 to 20;
  each m is independently 0 to 20;
  m+n is greater than 0;
  each $R^1$ is independently a linear or branched alkyl group having 5 to 29 carbons optionally comprising at least 1 unsaturated bond;
  each $R^2$ is independently —H, or a linear or branched alkyl group having 6 to 30 carbons optionally comprising at least 1 unsaturated bond;
  or a mixtures thereof,
provided that when the compound is of Formula (Ia) then at least one of R or $R^2$ is —H;
  each $R^3$ is independently a —H; —$R^1$; —C(O)$R^1$; —($CH_2CH_2O)_n$($CH(CH_3)CH_2O)_m R^2$;
or —($CH_2CH_2O)_n$($C(CH(CH_3)CH_2O)_m C(O)R$;
  each $R^4$ is independently —H, a linear or branched alkyl group having 6 to 30 carbons optionally comprising at least 1 unsaturated bond, or combinations thereof; —($CH_2CH_2O)_n$($CH(CH_3)CH_2O)_m R^2$;
or —($CH_2CH_2O)_{n'}$($CH(CH_3)CH_2O)_{m'}C(O)R^1$;
  each n' is independently 0 to 20;
  each m' is independently 0 to 20;
  m'+n' is greater than 0;
  provided when the compound is Formula (Ib), then at least one $R^2$, $R^3$ or $R^4$ is a —H; and
  each $R^{19}$ is —H, —C(O)$R^1$, or —$CH_2C[CH_2OR]_3$,
  provided when the compound is Formula (Ic), then at least one $R^{19}$ or R is —H.

For compounds of Formula (Ia), (Ib), or (Ic), the —($CH_2CH_2O$)— represents oxyethylene groups (EO) and —($CH(CH_3)CH_2O$)— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example.

In one embodiment, a compound for imparting water repellency and optionally stain release to substrates prepared by: (i) reacting (a) at least one isocyanate group-containing isocyanate, diisocyanate, polyisocyanate, or mixture thereof, and compounds of Formula (Ia). Compounds of Formula (Ia) where at least one of R is —H and at least one R is selected from —C(O)$R^1$ are commonly known as alkyl sorbitans. These sorbitans can be mono-substituted, di-substituted, or tri-substituted with —C(O)$R^1$. It is known that commercially available sorbitans, such as SPAN, contain a mixture of the various sorbitans ranging from where each R is H (un-substituted), and sorbitans where each R is —C(O)$R^1$ (fully substituted); wherein $R^1$ is a linear or branched alkyl group having 5 to 29 carbons; and mixtures of various substitutions thereof. The commercially available sorbitans may also include amounts of sorbitol, isosorbide, or other intermediates or byproducts.

In one preferred embodiment, at least one R is —C(O)$R^1$, and $R^1$ is a linear branched alkyl group having 5 to 29 carbons, more preferably 7 to 21 carbons, and most preferably 11 to 21 carbons. Preferred compounds include mono-, di-, and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds include mono-, di-, and tri-substituted sorbitan stearates or sorbitan behenins.

Optionally, $R^1$ is a linear or branched alkyl group having 5 to 29 carbons comprising at least 1 unsaturated bond. Examples of compounds of Formula (Ia) wherein at least one R is selected from —C(O)$R^1$; and $R^1$ contains least 1 unsaturated bond, include, but are not limited to, sorbitan trioleate (i.e., wherein $R^1$ is —$C_7H_{14}CH$=$CHC_8H_{17}$). Other examples include but are not limited to mono-, di-, and tri-substituted sorbitans derived from palmitoleic acid, lineolic acid, arachidonic acid, and erucic acid.

In one embodiment, a compound of Formula (Ia) is employed, wherein at least one R is independently —($CH_2CH_2O)_n$($CH(CH_3)CH_2O)_m R^2$ or —($CH_2CH_2O)_n$($CH(CH_3)CH_2O)_m C(O)R^1$. Compounds of Formula (Ia), wherein at least one R is —($CH_2CH_2O)_n$($CH(CH_3)CH_2O)_m R^2$ or —($CH_2CH_2O)_n$($CH(O)CH_3)CH_2O)_m C(O)R^1$, wherein each m is independently 0 to 20, each n is independently 0 to 20, and n+m is greater than 0 are known as polysorbates and are commercially available under the tradename TWEEN. These polysorbates can be mono-substituted, di-substituted, or tri-substituted with alkyl groups $R^1$ or $R^2$. It is known that commercially available polysorbates, contain a mixture of the various polysorbates ranging from where each $R^2$ is H (unsubstituted), and polysorbates where each $R^1$ is a linear or branched alkyl group having 5 to 29 carbons (fully substituted); and mixtures of various substitutions thereof. Examples of compounds of Formula (Ia) include polysorbates such as polysorbate tristearate, and polysorbate monostearate. Examples of compounds of Formula (Ia) wherein m+n is greater than 0, and wherein $R^1$ comprises at least 1 unsaturated bond, but not limited to, polysorbate trioleate (wherein $R^1$ is $C_7H_{14}CH=CHC_8H_{17}$) and are sold commercially under the name Polysorbate 80. Reagents may include mixtures of compounds having various values for R, $R^1$, and $R^2$, and may also include mixtures of compounds where $R^1$ comprises at least one unsaturated bond with compounds where $R^1$ is fully saturated.

Compounds of Formula (Ib) are known as alkyl citrates. These citrates can be present as a mono-substituted, di-substituted, or tri-substituted with alkyl groups. It is known that commercially available citrates contain a mixture of the various citrates as well as citric acids from where $R^3$ and each $R^4$ is —H, ranging to citrates where each $R^4$ is a linear or branched alkyl group having 6 to 30 carbons optionally comprising at least 1 unsaturated bond; and mixtures of various substitutions thereof. Mixtures of citrates having various values for $R^1$, $R^2$, $R^3$, and $R^4$ may be used, and may also include mixtures of compounds where $R^1$ comprises at least one unsaturated bond with compounds where $R^1$ is fully saturated. Alkyl citrates are also commercially available wherein m'+n' is greater than 0, $R^4$ is —$(CH_2CH_2O)_{n'}(CH(CH_3)CH_2O)_{m'}R^2$; or —$(CH_2CH_2O)_n(CH(CH_3)CH_2O)_mC(O)R^1$ and are present in the various substitutions from wherein $R^3$ and each $R^2$ is H to wherein each $R^1$ and/or $R^2$ is a linear or branched alkyl group having 5 to 30 carbons optionally comprising at least 1 unsaturated bond. Examples of compounds of Formula (Ib) include, but are not limited to, trialkyl citrates.

Compounds of Formula (Ic) are known as pentaerythriol esters. These pentaerythriol esters can be present as a mono-substituted, di-substituted, or tri-substituted with alkyl groups. Preferred compounds of Formula (Ic) are dipentaerythriol esters, where $R^{19}$ is —$CH_2C[CH_2OR]_3$. It is known that commercially available pentaerythriol esters contain a mixture of the various pentaerythriol esters where $R^{19}$ and each R is —H, ranging to pentaerythriol esters where each R is —$C(O)R^1$, and $R^1$ is a linear or branched alkyl group having 5 to 29 carbons optionally comprising at least 1 unsaturated bond; and mixtures of various substitutions thereof. The pentaerythriol esters also may contain compounds with mixtures of different chain lengths for R, or mixtures of compounds where $R^1$ comprises at least one unsaturated bond with compounds where $R^1$ is fully saturated.

Compounds of Formulas (Ia), (Ib), and (Ic) can all be bio-based derived. By "bio-based derived", it is meant that at least 10% of the material can be produced from non-crude oil sources, such as plants, other vegetation, and tallow. In one embodiment, the compounds of formulas (Ia), (Ib), and (Ic) are from about 10% to 100% bio-based. In one embodiment, the compounds of formulas (Ia), (Ib), and (Ic) are from about 35% to 100% bio-based. In one embodiment, the compounds of formulas (Ia), (Ib), and (Ic) are from about 50% to 100% bio-based. In one embodiment, the compounds of formulas (Ia), (Ib), and (Ic) are from about 75% to 100% bio-based. In one embodiment, the compounds of formulas (Ia), (Ib), and (Ic) are 100% bio-based. At least one R, $R^3$, $R^4$, $R^{19}$ of each of Formulas (Ia), (Ib), and (Ic) is —H to allow reactivity with isocyanate groups. The average OH value of the compounds can range from just greater than 0 to about 230, preferably about 10 to about 175, and most preferably from about 25 to about 140.

To make the compounds of the present invention, a compound of formula (Ia), (Ib), or (Ic), or mixtures thereof, is reacted with an isocyanate group-containing isocyanate, diisocyanate, polyisocyanate, or mixture thereof. The isocyanate group-containing compound adds to the branched nature of the polymer. The term "polyisocyanate" is defined as di- and higher-functional isocyanates, and the term includes oligomers. Any monoisocyanate or polyisocyanate having predominately two or more isocyanate groups, or any isocyanate precursor of a polyisocyanate having predominately two or more isocyanate groups, is suitable for use in this invention. For example, hexamethylene diisocyanate homopolymers are suitable for use herein and are commercially available. It is recognized that minor amounts of diisocyanates can remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers. Preferred is DESMODUR N-100 (a hexamethylene diisocyanate-based available from Bayer Corporation, Pittsburgh, Pa.). Other triisocyanates useful for the purposes of this invention are those obtained by reacting three moles of toluene diisocyanate. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanatocylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Particularly preferred as the (poly)isocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of formulas (IIa), (IIb), (IIc) and (IId):

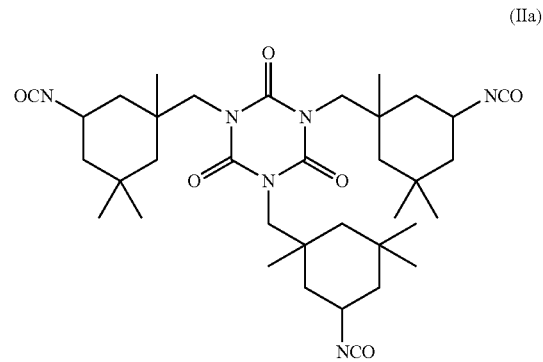

(IIa)

-continued

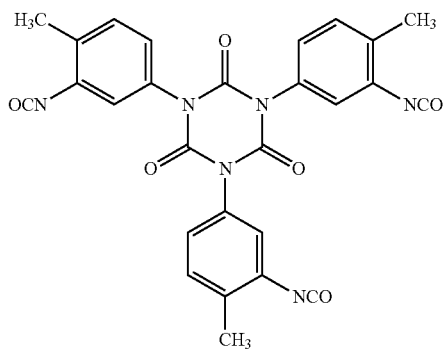
(IIb)

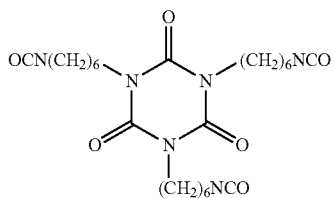
(IIc)

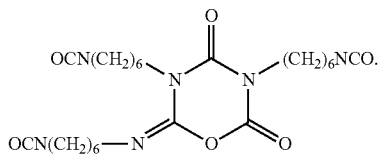
(IId)

The diisocyanate trimers (IIa-d) are available, for instance as DESMODUR Z4470, DESMODUR IL, DESMODUR N-3300, and DESMODUR XP2410, respectively, from Bayer Corporation.

In one embodiment, the reaction product of (a) an isocyanate-containing compound with (b) an isocyanate-reactive compound contains unreacted isocyanate groups which are further reacted with (c) at least one second compound selected from water, organic compounds of Formula (IIIa)

$$R^5-X \quad (IIIa),$$

organic compounds of Formula (IIIb)

$$R^{15}-(OCH_2CH(OR^{16})CH_2)_z-OR^{17} \quad (IIIb),$$

or mixtures thereof, wherein $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy-functional linear or branched organosiloxane, a thiol-functional C to $C_{30}$ linear or branched alkyl, an amine-functional $C_1$ to $C_{30}$ linear or branched alkyl,

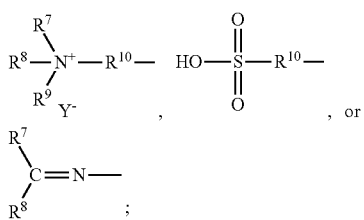

wherein $R^7$, $R^8$, and $R^9$ are each independently, —H, —$C_1$ to $C_6$ alkyl, or combinations thereof; $R^{10}$ is a divalent alkyl group of 1 to 20 carbons; X is an isocyanate-reactive functional group such as —OH, —C(O)OH, —SH, —NH ($R^{12}$), —O—$(CH_2CH_2O)_s(CH(CH_3)CH_2O)_t$—H or —[C(O)]—O—$(CH_2CH_2O)_s(CH(H(CH_3)CH_2O)_t$—H; $R^{12}$ is —H or a monovalent $C_1$ to $C_6$ alkyl group; $R^{11}$, $R^{16}$, and $R^{17}$ are each independently a —H; —$R^{18}$; —C(O)$R^{18}$ provided that at least one $R^{15}$, $R^{16}$ or $R^{17}$ is a —H; $R^{18}$ is independently a linear or branched alkyl group having 5 to 29 carbons optionally comprising at least 1 unsaturated bond; z is 1 to 15; Y is —Cl; s is an integer of 0 to 50; t is an integer of 0 to 50; s+t is greater than 0. The term "branched", as used herein, means that the functional chain can be branched at any point, for example as a quaternary substituted carbon, and can contain any number of branched substitutions.

In one embodiment, the second compound is present and reacts with about 0.1 mol % to about 60 mol % of said isocyanate groups. Preferably the concentration of compounds of isocyanate-reactive compound (b) is greater than the concentration of second compound(s) (c).

In one embodiment, the second compound (c) is water. Water may be used to crosslink unreacted isocyanate groups by urea linkage. In a further embodiment, the second compound (c) is of Formula (IIIa). The compound of formula (IIIa) can be a hydrophilic water-solvatable material comprising at least one hydroxy-terminated polyether of formula (IIIa) wherein isocyanate-reactive group X is —O—$(CH_2CH_2O)_s(CH(CH_3)CH_2O)_t$—H or —[C(O)]—O—$(CH_2CH_2O)_s(CH(CH_3)CH_2O)_t$—H. In this embodiment, —$(CH_2CH_2O)$— represents oxyethylene groups (EO) and —$(CH(CH_3)CH_2O)$— represents oxypropylene groups (PO). These polyethers can contain only EO groups, only PO groups, or mixtures thereof. These polyethers can also be present as a tri-block copolymer designated PEG-PPG-PEG (polyethylene glycol-polypropylene glycol-polyethylene glycol). Preferably, the polyethers are the commercially available methoxypolyethylene glycols (MPEG's), or mixtures thereof. Also commercially available, and suitable for the preparation of the compositions of the present invention, are butoxypolyoxyalkylenes containing equal amounts by weight of oxyethylene and oxypropylene groups (Union Carbide Corp. 50-HB Series UCON Fluids and Lubricants) and having an average molecular weight greater than about 1000. The hydroxy-terminal polyethers of Formula (IIIa) preferably have an average molecular weight equal to or greater than about 200, and most preferably between 350 and 2000.

In another embodiment, the second compound (c) is an organic compound of Formula (IIIa), where isocyanate-reactive group X is —OH, —C(O)OH, —SH, —NH($R^{12}$); and $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy- or amine-functional linear or branched organosiloxane, a thiol-functional $C_1$ to $C_{30}$ linear or branched alkyl, an amine-functional $C_1$ to $C_{30}$ linear or branched alkyl.

Where isocyanate-reactive group X is —OH, examples of Formula (IIIa) include but are not limited to alkyl alcohols such as propanol, butanol, or fatty alcohols including stearyl alcohol ($R^5$ is a —$C_1$ to $C_{30}$ linear or branched alkyl optionally comprising at least one unsaturated group); alkyl diols or polyols such as ethanediol, propanediol, butanediol, or hexanediol ($R^5$ is a hydroxy-functional $C_1$ to $C_{30}$ linear or branched alkyl); alkylene glycol ethers such as triethylene glycol, tetraethylene glycol, poly(ethylene glycol) (PEG), poly(propylene glycol) (PPG), poly(tetrahydrofuran), or glycol ethers having mixtures of PEG, PPG, or THF units ($R^5$ is a hydroxy-functional linear or branched $C_1$ to $C_{30}$ polyether); polyester polyols ($R^5$ is a hydroxy-functional linear or branched polyester); silicone prepolymer polyols ($R^5$ is a hydroxy-functional linear or branched organosiloxane); N,N-dimethylaminoethanol ($R^5$ is an amine-functional $C_1$ to $C_{30}$ linear or branched alkyl); choline chloride or betaine HCl ($R^5$ is $Y^-(R^7)(R^5)(R^9)N^+R^{10}$—); butanone oxime ($R^5$ is $(R^7)(R^3)C$=N—). The polyether polyols can contain only EO groups, only PO groups, only THF groups, or mixtures thereof. These polyethers can also be present as a block copolymer, such as that designated by PEG-PPG-PEG (polyethylene glycol-polypropylene glycol-polyethylene glycol). Preferably, the polyether glycols have an average molecular weight equal to or greater than about 200, and most preferably between 350 and 2000.

Where isocyanate-reactive group X is —C(O)OH, examples of Formula (IIIa) include but are not limited to fatty acids such as caprylic acid, capric acid, lauric acid, mysteric acid, palmitic acid, stearic acid, arachidic acid, behenic acid, lignoceric acid, palmitoleic acid, lineolic acid, arachidonic acid, oleic acid, or erucic acid ($R^5$ is a —$C_1$ to $C_{30}$ linear or branched alkyl optionally comprising at least one unsaturated group); hydroxy-containing acids such as hydroxycaprylic acid, hydroxycapric acid, hydroxylauric acid, hydroxymysteric acid, hydroxypalmitic acid, hydroxystearic acid, hydroxyarachidic acid, hydroxybehenic acid, hydroxylignoceric acid, hydroxypalmitoleic acid, hydroxylineolic acid, hydroxyarachidonic acid, hydroxyoleic acid, or hydroxyerucic acid ($R^5$ is a hydroxy-functional $C_1$ to $C_{30}$ linear or branched alkyl); and mercaptoalkanoic acids such as mercaptopropionic acid ($R^5$ is a thiol-functional $C_1$ to $C_{30}$ linear or branched alkyl).

Where isocyanate-reactive group X is —SH, specific examples of Formula (IIIa) include but are not limited to alkyl thiols such as lauryl mercaptan or dodecyl mercaptan ($R^5$ is a —$C_1$ to $C_{30}$ linear or branched alkyl optionally comprising at least one unsaturated group). Where isocyanate-reactive group X is —NH($R^{12}$), specific examples of Formula (IIIa) include but are not limited to alkyl amines such as diisopropylamine, propylamine, hexylmine, or laurylamine ($R^5$ is a —$C_1$ to $C_{30}$ linear or branched alkyl optionally comprising at least one unsaturated group); alkanolamines such as ethanolamine or propanolamine ($R^5$ is a hydroxy-functional $C_1$ to $C_{30}$ linear or branched alkyl); silicone prepolymer polyamines ($R^5$ is a amine-functional linear or branched organosiloxane); alkyl diamines ($R^5$ is an amine-functional $C_1$ to $C_{30}$ linear or branched alkyl); and aminoalkanesulfonic acids such as 2-aminoethanesulfonic acid ($R^5$ is HO—$S(O)_2R^{10}$—).

In a further embodiment, the second compound (c) is of formula (IIIb). These compounds are commonly referred to as polyglycerols. These polyglycerols can be present where $R^{15}$, $R^{16}$, and $R^{17}$ are each independently a —H; —$R^{18}$; —C(O)$R^{18}$ provided that at least one $R^{15}$, $R^{16}$, or $R^{17}$ is a —H; and wherein $R^{18}$ is independently a linear or branched alkyl group having 5 to 29 carbons optionally comprising at least 1 unsaturated bond. Specific examples include but are not limited to triglycerol monostearate, triglycerol distearate, hexaglycerol monostearate, hexaglycerol distearate, decaglyceryl mono(carpylate/caprate), decaglyceryl di(carpylate/caprate), decaglycerol, polyglycerol-3, and C18 diglyceride.

In one embodiment, the reaction product of (a) an isocyanate-containing compound with (b) an isocyanate-reactive compound contains unreacted isocyanate groups which are further reacted with multiple second compounds (c) comprising both compounds of formula (IIIa) or (IIIb) and water.

The compounds of the present invention can be made in one step. The compounds of the present invention comprising more than one organic compound of Formula (Ia), (Ib), or (Ic) and/or on or more second compounds (c) can be also made in one step. Preferably, if more than one organic compounds of Formula (Ia), (Ib), or (Ic) and/or on or more second compounds (c) are used, then the synthesis can be completed sequentially. A sequential addition is especially useful when employing compounds of Formula (Ia), (Ib), or (Ic) with high OH numbers, or when using polyfunctional compounds (c). These steps comprise reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic) wherein each R is independently a —H; —$R^1$; —C(O)$R^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond; or a mixtures thereof, provided that when the compound is of Formula (Ia) then at least one of R or $R^2$ is —H; each $R^3$ is independently a —H; —$R^1$; —C(O)$R^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; each $R^4$ is independently —H, a linear or branched alkyl group having 6 to 30 carbons optionally comprising at least 1 unsaturated bond, or combinations thereof; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; each n' is independently 0 to 20; each m' is independently 0 to 20; m'+n' is greater than 0; provided when the compound is Formula (Ib), then at least one $R^2$, $R^3$ or $R^4$ is a —H; and each $R^{19}$ is —H, —C(O)$R^1$, or —CH$_2$C[CH$_2$OR]$_3$, provided when the compound is Formula (Ic), then at least one $R^{19}$ or R is —H. When a second compound (c) is used, molar concentrations of the at least one compound selected from Formula (Ia), (Ib), or (Ic) are such that there remains unreacted isocyanate groups to react with the one or more second compound(s) (c).

The at least one isocyanate, diisocyanate, polyisocyanate, or mixture thereof, and at least one isocyanate group-containing compound selected from isocyanate, diisocyanate, polyisocyanate, or mixture thereof, and (b) at least one isocyanate-reactive compound selected from formula (Ia), (Ib), or (Ic), or mixture thereof, are reacted. This reaction is typically conducted by charging a reaction vessel with the isocyanate, diisocyanate, or polyisocyanate, and at least one compound selected from formula (Ia), (Ib), or (Ic), or mixture thereof, and optionally a second compound (c). The order of reagent addition is not critical, but if water is used, the water should be added after the isocyanates and at least one compound selected from formula (Ia), (Ib), or (Ic), or mixture thereof are reacted.

The specific weight of the reactants charged is based on their equivalent weights and on the working capacity of the reaction vessel, and is adjusted so that compound selected from formula (Ia), (Ib), or (Ic) will be consumed in the first step. A suitable dry organic solvent free of isocyanate-reactive groups is typically used as a solvent. Ketones are the preferred solvents, and methylisobutylketone (MIBK) is particularly preferred for convenience and availability. The charge is agitated, and temperature adjusted to about 40° C. to 70° C. Typically, a catalyst such as iron(III) chloride in an organic solvent is then added, typically in an amount of from about 0.01 to about 1.0 weight % based on the dry weight of the composition, and the temperature is raised to about 80° C. to 100° C. A co-catalyst, such as sodium carbonate, may also be used. If water is to be added, the initial reaction is conducted so that less than 100% of the isocyanate groups are reacted. In the second step after holding for several hours, additional solvent, water, and optionally a second compound (c) are added, and the mixture is allowed to react for several more hours or until all of the isocyanate has been reacted.

In another embodiment, the present invention is a composition for imparting water repellency and optionally stain release to substrates comprising an aqueous solution or dispersion of at least one compound prepared by reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic). The composition comprises at least one compound of the present invention and a solvent or water and optionally one or more surfactants. In the process of preparing the aqeueous solutions or dispersions of the present invention, additional water can then be added along with surfactants, if desired, to the urethane compounds and stirred until thoroughly mixed. Following a homogenization or sonification step, the organic solvent can be removed by evaporation at reduced pressure, and the remaining aqueous solution or dispersion of the compound of the present invention can be used as is or subjected to further processing.

In addition to compounds of the present invention as described herein, these compositions may also comprise compounds that are present from commercially available sorbitans, polysorbates, alkyl citrates, or pentaethritols. These compounds can be present as a mixture of the various substituted organic compounds of Formula (Ia), (Ib), or (Ic) from fully unsubstituted to fully substituted, and the various substitutions in between, and optionally, the linear or branched alkyl group having 5 to 29 carbons comprises at least 1 unsaturated bond.

It will be apparent to one skilled in the art that many changes to any or all of the above procedures can also be used to optimize the reaction conditions for obtaining maximum yield, productivity, or product quality.

In another embodiment, the present invention is a method of treating a fibrous substrate comprising applying to the surface of the substrate a compound prepared by: (i) reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic) wherein each R is independently a —H; —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond; or a mixtures thereof, provided that when the compound is of Formula (Ia) then at least one of R or $R^2$ is —H; each $R^3$ is independently a —H; —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; each $R^4$ is independently —H, a linear or branched alkyl group having 6 to 30 carbons optionally comprising at least 1 unsaturated bond, or combinations thereof; —(CH$_2$CH$_2$O)$_n$(CH(CH$_3$)CH$_2$O)$_m$$R^2$; or —(CH$_2$CH$_2$O)$_{n'}$(CH(CH$_3$)CH$_2$O)$_{m'}$C(O)R; each n' is independently 0 to 20; each m' is independently 0 to 20; m'+n' is greater than 0; provided when the compound is Formula (Ib), then at least one $R^2$, $R^3$ or $R^4$ is a —H; and each $R^{19}$ is —H, —C(O)$R^1$, or —CH$_2$C[CH$_2$OR]$_3$, provided when the compound is Formula (Ic), then at least one $R^{19}$ or R is —H, said compound providing water repellency and optionally stain release to substrates contacted therewith.

The compound or composition of the present invention as described above is contacted with the substrate by any suitable method. Such methods include, but are not limited to, application by exhaustion, foam, flex-nip, nip, pad, kiss-roll, beck, skein, winch, liquid injection, overflow flood, roll, brush, roller, spray, dipping, immersion, and the like. The composition is also contacted by use of a beck dyeing procedure, continuous dyeing procedure or threadline application.

The compound or composition of the present invention is applied to the substrate as such, or in combination with other optional textile finishes or surface treating agents. Such optional additional components include treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain release, soil repellency, soil release, water repellency, odor control, antimicrobial, sun protection, cleanability and similar effects. One or more of such treating agents or finishes are applied to the substrate before, after, or simultaneously with the composition of the present invention. For example, for fibrous substrates, when synthetic or cotton fabrics are treated, use of a wetting agent can be desirable, such as ALKANOL 6112 available from E. I. du Pont de Nemours and Company, Wilmington, Del. When cotton or cotton-blended fabrics are treated, a wrinkle-resistant resin can be used such as PERMAFRESH EFC available from Omnova Solutions, Chester, S.C.

Other additives commonly used with such treating agents or finishes are also optionally present, such as surfactants, pH adjusters, cross linkers, wetting agents, wax extenders, and other additives known by those skilled in the art. Suitable surfactants include anionic, cationic, nonionic, N-oxides and amphoteric surfactants. Examples of such additives include processing aids, foaming agents, lubricants, anti-stains, and the like. The composition is applied at a manufacturing facility, retailer location, or prior to installation and use, or at a consumer location.

Optionally, a blocked isocyanate is added with the composition of the present invention to further promote durability (i.e., as a blended composition). An example of a suitable blocked isocyanate to use in the present invention is PHOBOL XAN available from Huntsman Corp, Salt Lake City, Utah. Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the substrate. When added as a blended isocyanate, amounts up to about 20% by weight are added.

The optimal treatment for a given substrate depends on (1) the characteristics of the compound or composition of the present invention, (2) the characteristics of the surface of the substrate, (3) the amount of compound or composition of the present invention applied to the surface, (4) the method of application of the compound or composition of the present invention onto the surface, and many other factors. Some compounds or compositions of the present invention work well on many different substrates and are repellent to water. Dispersions prepared from compounds of the present invention are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features.

In another embodiment, the present invention is a fibrous substrate having applied to its surface a compound or composition as disclosed above. The present invention further comprises substrates treated with a compound or composition of the present invention as described above. Suitable substrates include fibrous substrates. The fibrous substrates include fibers, yarns, fabrics, fabric blends, textiles, nonwovens, paper, leather, and carpets. These are made from natural or synthetic fibers including cotton, cellulose, wool, silk, rayon, nylon, aramid, acetate, acrylic, jute, sisal, sea grass, coir, polyamide, polyester, polyolefin, polyacrylonitrile, polypropylene, polyaramid, or blends thereof. By "fabric blends" is meant fabric made of two or more types of fibers. Typically these blends are a combination of at least one natural fiber and at least one synthetic fiber, but also can include a blend of two or more natural fibers or of two or more synthetic fibers. The nonwoven substrates include, for example, spunlaced nonwovens, such as SONTARA available from E. I. du Pont de Nemours and Company, Wilmington, Del., and spunbonded-meltblown-spunbonded nonwovens. The treated substrates of the present invention have excellent water repellency and optionally stain release properties.

The compounds, compositions, method, and substrates of the present invention are useful to provide excellent water repellency and optionally stain release to treated substrates. The surface properties are obtained using a non-fluorinated organic urethane as defined above. The use of non-fluorinated organic urethane have been found to provide superior water repellency and durable water repellency compared to traditional non-fluorinated water repellents and are comparable to commercially available fluorinated water repellents. The treated substrates of the present invention are useful in a variety of applications and products such as clothing, protective garments, carpet, upholstery, furnishings, and other uses. The excellent surface properties described above help to maintain surface cleanliness and therefore can permit longer use.

Test Methods and Materials

All solvents and reagents, unless otherwise indicated, were purchased from Sigma-Aldrich, St. Louis, Mo., and used directly as supplied. MPEG 750 and MPEG 1000 are defined as poly(ethylene glycol) methyl ether 750 and poly(ethylene glycol) methyl ether 1000, respectively, and are commercially available from Sigma-Aldrich, St. Louis, Mo. Tergitol® TMN-10 is commercially available from Sigma-Aldrich, St. Louis, Mo.

Sorbitan tristearate and sorbitan monostearate are commercially available from Croda, East Yorkshire, England, or DuPont Nutrition & Health, Copenhagen, Denmark. Low-OH sorbitan tristearate (OH value <65), dipentaerythritol esters, sorbitan ester-lauric acid, sorbitan tribehenin 40, sorbitan tribehenin 50, sorbitan tribehenin 88, and glycerol distearate was obtained from DuPont Nutrition & Health, Copenhagen, Denmark.

DESMODUR N-100, DESMODUR H, DESMODUR I, DESMODUR N3300, DESMODUR N3790BA, DESMODUR Z4470, and DESMODUR XP2410 were obtained from Bayer Corporation, Pittsburgh, Pa.

JEFFAMINE M-1000, JEFFAMINE M-2070, and PHOBOL XAN were obtained from Huntsman Corp., Salt Lake City, Utah.

PRIPOL 2033 (amorphous dimer diol), PRIAMINE 1075 (dimer diamine), PRIPLAST 3293 (semicrystalline polyester polyol), sorbitan trioleate, polyoxyethylenesorbitan tristearate, polyoxyethylenesorbitan trioleate, tetraethoxysorbitan monostearate, polyoxyethylenesorbitan monostearate, and polyoxyethylene(4) sorbitan monostearate were obtained from Croda, East Yorkshire, England.

Tri(2-octadodecyl) citrate is commercially available from Lubrizol, Wickliffe, Ohio.

SILMER OH Di-10 (a small linear di-functional hydroxyl-terminated silicone pre-polymer) and SILMER NH Di-8 (a linear silicone with reactive amine terminal groups) are available from Siltech Corporation, Toronto, Canada.

PLURONIC L35 is commercially available from BASF, Ludwigshafen, Germany. ARMEEN DM-18D was obtained from Akzo-Nobel, Bridgewater, N.J.

Triglycerol monostearate and hexaglycerol distearate were obtained from Lonza, Allendale, N.J.

Decaglyceryl mono(caprylate/caprate) was obtained from Stepan, Northfield, Ill.

Polyglycerol-3 was obtained from Solvay Chemicals, Houston, Tex.

The following test methods and materials were used in the examples herein.

Test Method 1—Water Repellency

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances. The composition of standard test liquids is shown in the following Table 1. Ratings of 0.5 increments are determined by subtracting one half from the numbers in Table 1 for borderline passing of the test liquid.

TABLE 1

Standard Test Liquids

| Water Repellency Rating Number | Composition Vol. %, Isopropyl Alcohol | Composition, Vol. % Distilled Water |
| --- | --- | --- |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Test Method 2—Spray Test

The dynamic water repellency of treated substrates was measured according to the American Association of Textile Chemists and Colorists (AATCC) TM-22. Samples are visually scored by reference to published standards, with a rating of 100 denoting no water penetration or surface adhesion. A rating of 90 denotes slight random sticking or wetting without penetration; lower values indicate progressively greater wetting and penetration. Test Method 2, the dynamic water repellency test, is a demanding and realistic test of water repellency.

Test Method 3—Stain Release

This test measures the ability of a fabric to release oily stains during home laundering.

Treated textiles are placed on a flat surface. Using an eyedropper, 5 drops of MAZOLA Corn Oil or mineral oil (0.2 mL) were placed onto the fabric to form 1 drop of oil. A weight (5 lb, 2.27 kg) is placed on top of the oil drop with a piece of glassine paper separating the oil drop. The weight was left in place for 60 seconds. After 60 seconds, the weight and glassine paper are removed. The textiles samples were then washed using a automatic washer high for 12 minutes with AATCC 1993 Standard Reference Detergent WOB12 or granular detergent (100 g). The textiles were then dried on high for 45-50 minutes. The textiles were then evaluated for residual stain of 1 to 5, 1 having the largest residual stain remaining and 5 being no stain residual was visible.

Test Method 4—Fabric Treatment

The fabrics treated in this study were 100% by weight khaki cotton twill available from SDL Atlas Textile Testing Solutions, Rock Hill, S.C. 29732 and 100% by weight red polyester fabric available from L. Michael O Y, Finland. The fabric was treated with the aqueous dispersions various emulsion polymer using a conventional pad bath (dipping) process. The prepared concentrated dispersion of the polymer emulsions were diluted with deionized water to achieve a pad bath having 60 g/L or 100 g/L of the final emulsion in the bath.

Examples of the compounds and compositions of the instant invention can be made from various isocyanates and organic compounds of Formulas (Ia), (Ib), (Ic), or mixtures thereof. The present invention is not to be limited by the examples below.

Preparation of Trioctadecyl Citrate

In a 4-neck round bottom flask equipped with an overhead stirrer, thermocouple, dean-stark/condenser was added stearyl alcohol (100.0 g), citric acid (20 g), toluene (150 g) and sulfuric acid (2 g). The solution was refluxed for 8 hours to facility the removal of the water generated during the esterification. After the 8 hours, the crude citrate was precipitated at 0° C., filtered, and recrystallized using ethanol.

Example 1

In a 4-neck round bottom flask equipped with an overhead stirrer, thermocouple, dean-stark/condenser was added sorbitan tristearate (116.0 g; Hydroxy Number=77.2 mgKOH/g) and 4-methyl-2-pentanone (MIBK, 150 g). The solution was refluxed for 1 hour to remove any residual moisture. After the hour, the solution was cooled to 50° C. and DESMODUR N-100 (30 g) was added followed by a catalyst and the solution was heated to 80° C. over one hour.

Example 2

An aqueous dispersion of the compound as described in Example 1 was prepared. Water (300 g), ARMEEN DM-18D (5.6 g), TERGITOL TMN-10 (2.8 g), and acetic acid (3.4 g) was added to a beaker and stirred to from a surfactant solution. The solution was heated to 60° C. The sorbitan urethane/MIBK solution, as prepared in Example 1, was cooled to 60° C. and the surfactant solution was added slowly to produce a milky emulsion. The mixture was homogenized at 6000 psi, and the resulting emulsion was distilled under reduced pressure to remove the solvent, yielding a non-flammable urethane dispersion at 25% solids. This urethane dispersion was applied to textiles and tested according to the test methods above.

Examples 3 to 23

Examples 3 to 23 demonstrate various compounds of the present invention prepared as described in Examples 1 (compounds) and Example 2 (dispersions) with an isocyanate (DESMODUR N100) and one or more different compounds of Formula (Ia) such as sorbitan tristearate, sorbitan trioleate, sorbitain monostearate, and mixtures thereof. When more than one sorbitan ester reagent was used, the second sorbitan reagent was added, and the reaction mixture was heated at 80° C. for an additional four hours. Examples 3 to 23 were applied as dispersions to textiles at 60 g/L, and tested according to the test methods above.

Comparative Example A

Comparative Example A represents an aqueous dispersion made using the compound of Formula (Ia), without an isocyanate compound. Water (166.0 g), ARMEEN DM-18D (2.29 g), TERGITOL TMN-10 (1.6 g), and acetic acid (1.4 g) were added to a beaker and stirred to form a surfactant solution. The solution was heated to 60° C. Sorbitan tristearate (60.52 g; Hydroxy Number=69.5 mgKOH/g), was heated to 80° C. and the surfactant solution was added slowly to produce a milky emulsion. The mixture was homogenized at 6000 psi, and the resulting emulsion was distilled under reduced pressure to remove the solvent, yielding a non-flammable dispersion at 25% solids. This dispersion was applied to textiles and tested according to the test methods above.

TABLE 2

Compositions of Examples 2 to 23.

| | Component (a) Desmodur N100 (g) | Component (b) Sorbitan Tristearate (g) | Component (b) Sorbitan Trioleate (g) | Component (b) Sorbitan Monostearate (g) |
|---|---|---|---|---|
| Ex. 2 | 30.0 | 116.0 | 0 | 0 |
| Ex. 3 | 30.1 | 0 | 147.0 | 0 |
| Ex. 4 | 30.0 | 58.0 | 70.0 | 0 |
| Ex. 5 | 30.0 | 113.5 | 0 | 1.2 |
| Ex. 6 | 30.0 | 81.2 | 0 | 10.8 |
| Ex. 7 | 30.0 | 98.6 | 0 | 5.4 |
| Ex. 8 | 30.0 | 0 | 102.5 | 11.2 |
| Ex. 9 | 30.2 | 0 | 125.0 | 5.4 |
| Ex. 10 | 30.0 | 113.5 | 0 | 1.2 |
| Ex. 11 | 30.2 | 49.3 | 62.0 | 5.4 |
| Ex. 12 | 30.0 | 49.3 | 62.0 | 5.4 |
| Ex. 13 | 30.1 | 49.3 | 62.0 | 5.4 |
| Ex. 14 | 30.0 | 49.3 | 59.5 | 5.4 |
| Ex. 15 | 30.0 | 40.6 | 49.0 | 10.8 |
| Ex. 16 | 30.0 | 49.3 | 59.5 | 5.4 |
| Ex. 17 | 30.0 | 74.0 | 45.0 | 1.4 |
| Ex. 18 | 30.0 | 1.2 | 135.25 | 0 |
| Ex. 19 | 30.0 | 105.5 | 0 | 3.5 |
| Ex. 20 | 30.0 | 127.5 | 0 | 1.25 |
| Ex. 21 | 30.0 | 115.4 | 0 | 1.25 |
| Ex. 22 | 30.0 | 113.8 | 0 | 1.25 |
| Ex. 23 | 15.0 | 60.1 | 0 | 0.61 |
| Comp. Ex. A | 0 | 60.52 | 0 | 0 |

TABLE 3

Performance Data of Examples 2 to 23 and Comparative Example A

| | Cotton Water Drop | Cotton Spray | Polyester Water Drop | Polyester Spray |
|---|---|---|---|---|
| Ex. 2 | 4 | 100 | — | — |
| Ex. 3 | 2 | 75 | 0 | 80 |
| Ex. 4 | 3 | — | 3 | — |
| Ex. 5 | 4 | 100 | — | — |
| Ex. 6 | 3 | — | 3 | — |
| Ex. 7 | 3 | — | 3 | — |
| Ex. 8 | 2 | 80 | 2 | 0 |
| Ex. 9 | 2 | 75 | 0 | 0 |
| Ex. 10 | 3 | 80 | 3 | 100 |
| Ex. 11 | 4 | 90 | 3 | 100 |
| Ex. 12 | 4 | 90 | 3 | 100 |
| Ex. 13 | 4 | 90 | 3 | 100 |
| Ex. 14 | 3 | — | 3 | — |
| Ex. 15 | 3 | — | 3 | — |
| Ex. 16 | 3 | — | 3 | — |
| Ex. 17 | 4 | 100 | — | — |
| Ex. 18 | 3 | 80 | — | — |
| Ex. 19 | 4 | 100 | — | — |
| Ex. 20 | 3 | 80 | 3 | 100 |
| Ex. 21 | 3 | 100 | 3 | 100 |
| Ex. 22 | 3 | 100 | 3 | 100 |
| Ex. 23 | 3 | 90 | — | — |
| Comp. Ex. A | 3 | 50 | 1 | 50 |

Examples 24 to 31

Examples 24 to 31 follow the procedures of Examples 1 (compounds) and Example 2 (dispersions), using various isocyanates and from one to two different compounds of Formula (Ia) as described in Table 4. When more than one compounds of Formula (Ia) was used, the second compound was added, and the reaction mixture was heated at 80° C. for an additional four hours. Examples 24 to 31 were applied as dispersions to textiles at 60 g/L, and tested according to the test methods described above.

TABLE 4

Compositions of Examples 24 to 31

| | Component (a) Compound | Component (a) Amount (g) | Component (b) Sorbitan Tristearate (g) | Component (b) Sorbitan Trioleate (g) | Component (b) Sorbitan Monostearate (g) |
|---|---|---|---|---|---|
| Ex. 24 | Desmodur H | 26.4 | 113.5 | 0 | 1.2 |
| Ex. 25 | Desmodur I | 24.7 | 0 | 212.8 | 0 |
| Ex. 26 | Desmodur N3300 | 30.4 | 0 | 135.25 | 1.2 |
| Ex. 27 | Desmodur N3790BA | 15.0 | 45.35 | 0 | 0.5 |
| Ex. 28 | Desmodur Z4470BA | 22.5 | 44.25 | 0 | 0.75 |
| Ex. 29 | Desmodur XP2410 | 15.0 | 59.5 | 0 | 0.9 |
| Ex. 30 | Desmodur I | 24.7 | 0 | 212.8 | 0 |
| Ex. 31 | Desmodur I | 30.2 | 113.5 | 0 | 1.2 |

TABLE 5

Performance Data of Examples 24 to 31

| | Cotton Water Drop | Cotton Spray | Polyester Water Drop | Polyester Spray |
|---|---|---|---|---|
| Ex. 24 | 3 | 85 | 3 | 100 |
| Ex. 25 | 3 | 70 | 3 | 80 |
| Ex. 26 | 3 | 75 | — | — |
| Ex. 27 | 3 | 90 | — | — |
| Ex. 28 | 3 | 100 | — | — |
| Ex. 29 | 3 | 100 | — | — |

TABLE 5-continued

Performance Data of Examples 24 to 31

| | Cotton | | Polyester | |
|---|---|---|---|---|
| | Water Drop | Spray | Water Drop | Spray |
| Ex. 30 | 4 | 100 | — | — |
| Ex. 31 | 3 | 70 | — | — |

Examples 32 to 36

Examples 32 to 36 follow the procedures of Examples 1 (compounds) and Example 2 (dispersions), using DESMODUR N-100 isocyanate, one to two different compounds of Formula (Ia), and an acid monomer as described in Table 6. Example 36 also included a stearyl alcohol monomer. The acid monomer, stearyl alcohol, and any additional compounds of Formula (Ia) were added to the reaction after the initial compound of Formula (Ia) and isocyanate had reacted for 1 hour, and the reaction mixture was heated at 80° C. for an additional four hours. Examples 32 to 36 were applied as dispersions to textiles at 60 g/L, and tested according to the test methods described above.

TABLE 6

Compositions of Examples 32 to 36

| | Comp. (a) | Component (b) | | Component (c) | |
|---|---|---|---|---|---|
| | | Sorbitan | Sorbitan | | |
| | Desmodur N100 (g) | Tristearate (g) | Monostearate (g) | Compound | Amt (g) |
| Ex. 32 | 29.9 | 72.2 | 1.4 | Behenic Acid | 16.5 |
| Ex. 33 | 30.0 | 73.3 | 1.4 | Erucic Acid | 16.8 |
| Ex. 34 | 30.0 | 36.1 | 1.4 | Behenic Acid | 41.5 |
| Ex. 35 | 29.9 | 41.1 | 1.4 | Behenic Acid | 45.5 |
| Ex. 36 | 30.0 | 73.4 | 1.4 | Behenic Acid/ Stearyl Alcohol | 8.2/ 6.8 |

TABLE 7

Performance Data of Examples 32 to 36

| | Cotton | | Polyester | |
|---|---|---|---|---|
| | Water Drop | Spray | Water Drop | Spray |
| Ex. 32 | 3 | 85 | 3 | 100 |
| Ex. 33 | 3 | 90 | 3 | 100 |
| Ex. 34 | 3 | 80 | 2 | 100 |
| Ex. 35 | 3 | 50 | 2 | 50 |
| Ex. 36 | 3 | 85 | 3 | 85 |

Examples 37 to 54

Examples 37 to 54 follow the procedures of Examples 1 (compounds) and Example 2 (dispersions), using an isocyanate, one to two different compounds of Formula (Ia), and MPEG 750 as described in Table 8. The MPEG 750 and any additional compounds of Formula (Ia) were added to the reaction after the initial compound of Formula (Ia) and isocyanate had reacted for 1 hour, and the reaction mixture was heated at 80° C. for an additional four hours. Examples 37 to 54 were applied as dispersions to textiles at 60 g/L, and tested according to the test methods described above.

TABLE 8

Compositions of Examples 37 to 54

| | Component (a) | | Component (b) | | | | Component (c) |
|---|---|---|---|---|---|---|---|
| | | | Sorbitan | Sorbitan | Sorbitan | Sorbitan | MPEG 750 |
| | Compound | Amount (g) | Tristearate (g) | Monostearate (g) | Distearate (g) | Tetrastearate (g) | (g) |
| Ex. 37 | Desmodur N100 | 27.4 | 50.0 | 1.3 | 0 | 0 | 51.6 |
| Ex. 38 | Desmodur N100 | 22.8 | 50.0 | 1.1 | 0 | 0 | 34.4 |
| Ex. 39 | Desmodur N100 | 34.2 | 50.0 | 1.7 | 0 | 0 | 77.5 |
| Ex. 40 | Desmodur N3300 | 24.9 | 50.0 | 4.2 | 0 | 0 | 46.5 |
| Ex. 41 | Desmodur H | 10.8 | 50.0 | 4.2 | 0 | 0 | 46.5 |
| Ex. 42 | N3790BA | 30.5 | 50.0 | 4.2 | 0 | 0 | 46.5 |
| Ex. 43 | Z4470BA | 45.6 | 50.0 | 4.2 | 0 | 0 | 46.5 |
| Ex. 44 | Desmodur N100 | 24.6 | 50.0 | 4.2 | 0 | 0 | 46.5 |
| Ex. 45 | Desmodur N100 | 24.6 | 50.0 | 0 | 0 | 0 | 46.5 |
| Ex. 46 | Desmodur N100 | 12.0 | 17.2 | 2.2 | 0 | 0 | 23.6 |
| Ex. 47 | Desmodur N100 | 12.0 | 0 | 4.5 | 0 | 0 | 33.0 |
| Ex. 48 | Desmodur N100 | 12.5 | 36.9 | 0 | 0 | 0 | 14.7 |
| Ex. 49 | Desmodur N3300 | 12.0 | 15.1 | 0 | 0 | 0 | 32.6 |
| Ex. 50 | Desmodur N3300 | 12.0 | 20.0 | 4.4 | 0 | 0 | 13.9 |
| Ex. 51 | Desmodur N100 | 12.3 | 15.6 | 0 | 0 | 0 | 33.9 |
| Ex. 52 | Desmodur N3300 | 12.0 | 35.1 | 0 | 0 | 0 | 14.0 |
| Ex. 53 | Desmodur N100 | 12.7 | 0 | 0 | 23.0 | 0 | 24.9 |
| Ex. 54 | Desmodur N100 | 12.1 | 0 | 0 | 0 | 40.8 | 23.8 |

TABLE 9

Performance Data of Examples 37 to 54

| | Cotton | | | |
|---|---|---|---|---|
| | Water Drop | Corn Oil | Mineral Oil | Spray |
| Ex. 37 | 3 | 3.5 | 3 | 75 |
| Ex. 38 | 3 | 3.5 | 3 | 75 |
| Ex. 39 | 3 | 3.5 | 3 | 75 |
| Ex. 40 | 3 | 4 | 3 | — |
| Ex. 41 | 2 | 4 | 3 | — |
| Ex. 42 | 3 | 3.5 | 3 | — |
| Ex. 43 | 3 | 3.5 | 3 | — |
| Ex. 44 | 2 | 4.5 | 4.5 | — |
| Ex. 45 | 2 | 4 | 4 | — |
| Ex. 46 | 3 | 4 | 3 | 70 |
| Ex. 47 | 1 | 3.5 | 3.5 | 0 |
| Ex. 48 | 3.5 | 2 | 1 | 85 |
| Ex. 49 | 3 | 4.5 | 3 | 50 |
| Ex. 50 | 3.5 | 3 | 1 | 85 |
| Ex. 51 | 3 | 4.5 | 3 | 50 |
| Ex. 52 | 3.5 | 3 | 1 | 85 |
| Ex. 53 | 4 | 3 | 2 | 75 |
| Ex. 54 | 4 | 2.5 | 1 | 80 |

Examples 55 to 62

Examples 55 to 62 follow the procedures of Examples 1 (compounds) and Example 2 (dispersions), using DESMODUR N-100 isocyanate, sorbitan tristearate, a glycol or alkoxylated monomer, and up to one additional reagent as described in Table 10. The glycol or alkoxylated monomer and additional reagents were added to the reaction after the initial compound of Formula (Ia) and isocyanate had reacted for 1 hour, and the reaction mixture was heated at 80° C. for an additional four hours. Examples 55 to 62 were applied as dispersions to textiles at 60 g/L, and tested according to the test methods described above.

TABLE 10

Compositions of Examples 55 to 62

| | Component (a) | Component (b) | Component (c) Formula (IIIa) | | Component (c) Additional | |
|---|---|---|---|---|---|---|
| | Desmodur N100 (g) | Sorbitan Tristearate (g) | Compound | Amount (g) | Compound | Amount (g) |
| Ex. 55 | 12.7 | 14.6 | MPEG 1000 | 44.2 | N,N-Dimethylaminoethanol | 0.3 |
| Ex. 56 | 12.5 | 14.3 | MPEG 1000 | 43.5 | Choline Chloride | 0.5 |
| Ex. 57 | 13.3 | 15.2 | MPEG 1000 | 46.2 | 2-aminoethanesulfonic acid | 0.4 |
| Ex. 58 | 12.1 | 14.6 | Jeffamine M-1000 | 44.3 | | |
| Ex. 59 | 12.3 | 14.8 | Jeffamine M-2070 | 90.1 | | |
| Ex. 60 | 1.7 | 6.2 | polypropylene glycol | 0.1 | | |
| Ex. 61 | 1.7 | 6.2 | tetrathylene glycol dodecyl ether | 0.2 | | |
| Ex. 62 | 1.7 | 5.9 | tetrathylene glycol dodecyl ether | 0.3 | | |

TABLE 11

Performance Data of Examples 55 to 62

| | Cotton | | | | Polyester | |
|---|---|---|---|---|---|---|
| | Water Drop | Corn Oil | Mineral Oil | Spray | Water Drop | Spray |
| Ex. 55 | 1 | 3 | 3 | 50 | — | — |
| Ex. 56 | 2 | 4 | 3 | 50 | — | — |
| Ex. 57 | 2 | 3 | 2.5 | 50 | — | — |
| Ex. 58 | 2 | 3.5 | 3 | 60 | — | — |
| Ex. 59 | 0.5 | 3.5 | 3 | 25 | — | — |
| Ex. 60 | 3 | — | — | 80 | 3 | 95 |
| Ex. 61 | 3 | — | — | 85 | 3 | 65 |
| Ex. 62 | 3 | — | — | 80 | 3 | 90 |

Examples 63 and 64

Examples 63 and 64 follow the procedures of Examples 1 (compounds) and Example 2 (dispersions), using DESMODUR N-100 isocyanate, an alkoxylated sorbitan ester, and up to one additional reagent as described in Table 12. The additional reagents were added to the reaction after the initial compound of Formula (Ia) and isocyanate had reacted for 1 hour, and the reaction mixture was heated at 80° C. for an additional four hours. Examples 63 and 64 were applied as dispersions to textiles at 60 g/L, and tested according to the test methods described above.

Example 65

Example 65 employs the use of DESMODUR N-100 isocyanate, an alkoxylated sorbitan ester, and MPEG 750 as described in Table 12. To a 40 mL scintillation vial, placed on a hotplatelstirrer and equipped with a nitrogen line and stir bar, tetraethoxysorbitan monostearate (0.8 g), and 8.5 g 4-methyl-2-pentanone (MIBK) were charged. The solution was stirred and heated to 55° C. for 10 minutes under nitrogen. Desmodur N-100 (1.7 g) was added and the reaction temperature was increased to 80° C. A 0.5 wt % Iron(III) chloride solution (in MIBK) was added and the reaction temperature was increased to 95° C. After six hours, MPEG 750 (4.5 g) was added. The reaction temperature was decreased to 80° C. and stirred overnight. The resulting mixture was standardized to 25% solids, applied to textiles at 60 g/L and tested according to the test methods above.

Examples 66 to 69

Examples 66 to 69 follow the procedures of Example 65, using DESMODUR N-100 isocyanate, an alkoxylated sorbitan ester, and up to one additional reagent as described in Table 12. The additional reagents were added to the reaction after the initial compound of Formula (Ia) and isocyanate had reacted for 6 hours, and the reaction mixture was heated at 80° C. overnight. Examples 66 to 69 were applied as dispersions to textiles at 60 g/L, and tested according to the test methods described above.

TABLE 12

Compositions of Examples 63 to 69

| | Component (a) | Component (b) | | | | | Component (c) | |
|---|---|---|---|---|---|---|---|---|
| | Desmodur N100 (g) | Polyoxyethylene sorbitan tristearate (g) | Polyoxyethylene sorbitan trioleate (g) | Tetra-ethoxy sorbitan monostearate (g) | Polyoxyethylene sorbitan monostearate (g) | Polyoxyethylene(4) sorbitan monostearate (g) | Laurylamine (g) | MPEG 750 (g) |
| Ex. 63 | 8.2 | 50 | 0 | 0 | 1.1 | 0 | 0 | 0 |
| Ex. 64 | 7.2 | 0 | 50.0 | 0 | 0 | 0 | 0 | 0 |
| Ex. 65 | 1.7 | 0 | 0 | 0.8 | 0 | 0 | 0 | 4.5 |
| Ex. 66 | 1.5 | 4.8 | 0 | 0 | 0 | 0 | 0.36 | 0 |
| Ex. 67 | 1.5 | 9.1 | 0 | 0 | 0 | 0 | 0.04 | 0 |
| Ex. 68 | 1.5 | 0 | 0 | 0 | 0 | 0.12 | 0 | |
| Ex. 69 | 1.5 | 0 | 0 | 0 | 0 | 0.24 | 0 | |

TABLE 13

Performance Data of Examples 63 to 69

| | Cotton | | | | Polyester | |
|---|---|---|---|---|---|---|
| | Water Drop | Corn Oil | Mineral Oil | Spray | Water Drop | Spray |
| Ex. 63 | 0 | 4 | 3 | 0 | — | — |
| Ex. 64 | 0 | 3.5 | 3 | 0 | — | — |
| Ex. 65 | 0 | — | — | 25 | — | — |
| Ex. 66 | 3 | — | — | 70 | 3 | 50 |
| Ex. 67 | 3 | — | — | 70 | 3 | 50 |
| Ex. 68 | 3 | — | — | 70 | 3 | 90 |
| Ex. 69 | 3 | — | — | 90 | 3 | 100 |

Examples 70 to 94

Examples 70 to 94 follow the procedures of Examples 1 (compounds) and Example 2 (dispersions), using an isocyanate, a compound of Formula (Ia), at least one alcohol reagent, and up to one additional reagent as described in Table 14. The alcohol reagent and additional reagents were added to the reaction after the initial compound of Formula (Ia) and isocyanate had reacted for 1 hour, and the reaction mixture was heated at 80° C. for an additional four hours. In Examples 88 to 91, sodium carbonate (0.5% by total reagent weight) was combined with the sorbitan tristearate before reaction. Examples 70 to 94 were applied as dispersions to textiles at 60 g/L, and tested according to the test methods described above.

Example 95

Example 95 follows the procedure of Example 65, using DESMODUR N-100 isocyanate, sorbitan tristearate, and PRIPOL 2033 as described in Table 14. The PRIPOL 2033 was added to the reaction after the initial compound of Formula (Ia) and isocyanate had reacted for 6 hours, and the reaction mixture was heated at 80° C. overnight. Example 93 was applied as dispersions to textiles at 60 g/L, and tested according to the test methods described above.

TABLE 14

Compositions of Examples 70 to 95

| | Component (a) | | Component (b) | Component (c) | | | |
|---|---|---|---|---|---|---|---|
| | Desmodur N100 (g) | Desmodur H (g) | Sorbitan Tristearate (g) | Compound | Amount (g) | Compound | Amount (g) |
| Ex. 70 | 24.6 | 0 | 50.0 | MPEG 750 | 46.5 | 1,3-propanediol | 0.8 |
| Ex. 71 | 24.6 | 0 | 50.0 | MPEG 750 | 46.5 | Silmer OH Di-10 | 10.6 |
| Ex. 72 | 24.6 | 0 | 50.0 | MPEG 750 | 46.5 | Silmer NH Di-8 | 9.9 |
| Ex. 73 | 24.6 | 0 | 50.0 | MPEG 750 | 46.5 | triethylene glycol | 1.6 |
| Ex. 74 | 24.6 | 0 | 50.0 | MPEG 750 | 46.5 | polypropylene glycol | 2.3 |
| Ex. 75 | 24.6 | 0 | 50.0 | MPEG 750 | 46.5 | Pripol 2033 | 2.9 |
| Ex. 76 | 24.6 | 0 | 50.0 | MPEG 750 | 46.5 | Priamine 1075 | 5.6 |
| Ex. 77 | 24.6 | 0 | 50.0 | MPEG 750 | 46.5 | Pluronics F68 | 88.7 |
| Ex. 78 | 24.6 | 0 | 50.0 | MPEG 750 | 46.5 | Pluronics L35 | 20.1 |
| Ex. 79 | 24.6 | 0 | 50.0 | MPEG 750 | 46.5 | 12-hydroxystearic acid | 4.0 |
| Ex. 80 | 24.6 | 0 | 50.0 | MPEG 750 | 46.5 | decaglycerol | 8.0 |
| Ex. 81 | 24.6 | 0 | 50.0 | MPEG 750 | 46.5 | poly(tetrahydrofuran) 250 | 2.6 |
| Ex. 82 | 24.6 | 0 | 50.0 | MPEG 750 | 46.5 | poly(tetrahydrofuran) 650 | 6.7 |
| Ex. 83 | 30.0 | 0 | 113.4 | t-butanol | 1.66 | — | — |

TABLE 14-continued

Compositions of Examples 70 to 95

| | Component (a) | | Component (b) | Component (c) | | | |
|---|---|---|---|---|---|---|---|
| | Desmodur N100 (g) | Desmodur H (g) | Sorbitan Tristearate (g) | Compound | Amount (g) | Compound | Amount (g) |
| Ex. 84 | 30.0 | 0 | 113.4 | water | 0.4 | — | — |
| Ex. 85 | 30.1 | 0 | 102.12 | water | 1.71 | | |
| Ex. 86 | 15.0 | 0 | 47.68 | t-butanol | 0.32 | | |
| Ex. 87 | 0 | 10.1 | 78.63 | water | 0.91 | | |
| Ex. 88 | 25.1 | 0 | 99.80 | n-butanol | 0.50 | | |
| Ex. 89 | 25.1 | 0 | 100.33 | water | 0.72 | | |
| Ex. 90 | 15.5 | 0 | 57.41 | n-butanol | 0.31 | | |
| Ex. 91 | 15.0 | 0 | 55.48 | PRIPLAST 3293 | 3.87 | | |
| Ex. 92 | 15.0 | 0 | 55.75 | n-butanol | 0.285 | | |
| Ex. 93 | 15.0 | 0 | 105.5 | n-butanol | 0.285 | | |
| Ex. 94 | 15.0 | 0 | 52.05 | n-butanol | 0.285 | | |
| Ex. 95 | 1.5 | 0 | 5.6 | Pripol 2033 | 0.06 | | |

TABLE 15

Performance Data of Examples 70 to 95

| | Cotton | | | Polyester | |
|---|---|---|---|---|---|
| | Water Drop | Corn Oil | Mineral Oil | Spray | Water Drop | Spray |
| Ex. 70 | 2 | 4.5 | 4.5 | — | — | — |
| Ex. 71 | 2 | 4.5 | 4.5 | — | — | — |
| Ex. 72 | 2 | 3.5 | 3 | — | — | — |
| Ex. 73 | 2 | 4 | 3 | — | — | — |
| Ex. 74 | 2 | 4.5 | 4 | — | — | — |
| Ex. 75 | 2 | 4 | 3 | — | — | — |
| Ex. 76 | 2 | 4 | 3 | — | — | — |
| Ex. 77 | 2 | 3.5 | 3 | — | — | — |
| Ex. 78 | 2 | 3.5 | 3 | — | — | — |
| Ex. 79 | 2 | 4 | 3.5 | — | — | — |
| Ex. 80 | 2 | 3.5 | 3 | — | — | — |
| Ex. 81 | 2 | 4 | 3 | — | — | — |
| Ex. 82 | 2 | 4.5 | 4 | — | — | — |
| Ex. 83 | 3 | — | — | 100 | 3 | 90 |
| Ex. 84 | 3 | — | — | 100 | 3 | 100 |
| Ex. 85 | 3 | — | — | 100 | 3 | 100 |
| Ex. 86 | 4 | — | — | 100 | 4 | 90 |
| Ex. 87 | 3 | — | — | 75 | 3 | 70 |
| Ex. 88 | 3 | — | — | 100 | 3 | 100 |
| Ex. 89 | 3 | — | — | 100 | 3 | 100 |
| Ex. 90 | 3 | — | — | 100 | | |
| Ex. 91 | 3 | — | — | 95 | 3 | 95 |
| Ex. 92 | 3 | — | — | 100 | 3 | 90 |
| Ex. 93 | 3 | — | — | 100 | 3 | 100 |
| Ex. 94 | 4 | — | — | 100 | 3 | 100 |
| Ex. 95 | 3 | — | — | 90 | 3 | 90 |

Examples 96 to 102 and 108 to 110

Examples 96 to 102 and 108 to 110 follow the procedures of Examples 1 (compounds) and Example 2 (dispersions), using DESMODUR N-100 isocyanate, one or more compounds of Formula (Ia) or Formula (Ib), and at least one additional reagent as described in Table 16. The additional reagents were added to the reaction after the initial compound of Formula (Ia) and (Ib) and isocyanate had reacted for 1 hour, and the reaction mixture was heated at 80° C. for an additional four hours. Examples 96 to 102 and 108 to 110 were applied as dispersions to textiles at 60 g/L, and tested according to the test methods described above.

Examples 103 to 107

Example 103 to 107 follow the procedure of Example 65, using DESMODUR N-100 isocyanate, one or more compounds of Formula (Ia) or Formula (Ib), and at least one additional reagent as described in Table 16. The additional reagents were added to the reaction after the initial compound of Formula (Ia) and (Ib) and isocyanate had reacted for 6 hours, and the reaction mixture was heated at 80° C. overnight. In Example 105, sodium carbonate (0.07 g) was combined with the sorbitan tristearate and sorbitan citrate before the isocyanate addition. Examples 103 to 104 and 106 to 107 were applied as dispersions to textiles at 60 g/L (Example 105 was applied at 100 g/L), and tested according to the test methods described above.

TABLE 16

Compositions of Examples 96 to 110

| | Component (a) Desmodur N100 (g) | Component (b) | | Component (c) | |
|---|---|---|---|---|---|
| | | Compound(s) | Amount(s) (g) | Compound(s) | Amount(s) (g) |
| Ex. 96 | 30.0 | Sorbitan tribehenin 40/sorbitan monostearate | 123.66/1.25 | | |
| Ex. 97 | 15.0 | Sorbitan tribehenin 50 | 62.5 | n-butanol | 0.285 |
| Ex. 98 | 15.0 | Sorbitan tribehenin 88 | 69.1 | n-butanol | 0.285 |
| Ex. 99 | 15.0 | Sorbitan tribehenin 40 | 66.3 | n-butanol | 0.285 |
| Ex. 100 | 15.0 | Dipentaerythritol esters | 68.05 | n-butanol | 0.855 |
| Ex. 101 | 15.0 | Sorbitan tristearate, low OH value | 171.1 | n-butanol | 0.855 |
| Ex. 102 | 15.0 | Sorbitan ester - lauric acid | 145.9 | n-butanol | 0.855 |
| Ex. 103 | 1.5 | Tri(2-octyldodecyl) citrate | 7.54 | Hexylamine | 0.02 |

TABLE 16-continued

Compositions of Examples 96 to 110

| | Component (a) Desmodur N100 (g) | Component (b) Compound(s) | Amount(s) (g) | Component (c) Compound(s) | Amount(s) (g) |
|---|---|---|---|---|---|
| Ex. 104 | 1.5 | Tri(2-octyldodecyl) citrate | 4.0 | Hexylamine | 0.2 |
| Ex. 105 | 1.5 | Sorbitan tristearate/ trioctyldodecyl citrate | 2.75/3.81 | n-butanol | 0.11 |
| Ex. 106 | 1.5 | Trioctadecyl citrate | 6.9 | stearyl mercaptan | 0.11 |
| Ex. 107 | 1.5 | Trioctadecyl citrate | 3.65 | stearyl mercaptan | 1.1 |
| Ex. 108 | 12.0 | Sorbitan tribehenin 50 | 26.5 | MPEG 750 | 23.6 |
| Ex. 109 | 12.1 | Sorbitan tribehenin 88 | 29.6 | MPEG 750 | 23.8 |
| Ex. 110 | 12.4 | Sorbitan tribehenin 40 | 29.0 | MPEG 750 | 24.3 |

TABLE 17

Performance Data of Examples 96 to 110

| | Cotton | | | | Polyester | |
|---|---|---|---|---|---|---|
| | Water Drop | Corn Oil | Mineral Oil | Spray | Water Drop | Spray |
| Ex. 96 | 3 | — | — | 80 | 3 | 100 |
| Ex. 97 | 3 | — | — | 100 | 3 | 90 |
| Ex. 98 | 3 | — | — | 100 | 3 | 85 |
| Ex. 99 | 3 | — | — | 100 | 3 | 100 |
| Ex. 100 | 3 | — | — | 100 | 3 | 95 |
| Ex. 101 | 3 | — | — | 60 | 3 | 100 |
| Ex. 102 | 3 | — | — | 60 | 2 | 50 |
| Ex. 103 | 3 | — | — | 70 | 3 | 50 |
| Ex. 104 | 3 | — | — | 70 | 3 | 50 |
| Ex. 105 | 3 | — | — | 80 | 3 | 60 |
| Ex. 106 | 3 | — | — | 100 | 3 | 100 |
| Ex. 107 | 3 | — | — | 80 | 3 | 100 |
| Ex. 108 | 4 | 3 | 2 | 75 | — | — |
| Ex. 109 | 4 | 3 | 1 | 80 | — | — |
| Ex. 110 | 4 | 3 | 1 | 75 | — | — |

Examples 111 to 114

Examples 111 to 114 follow the procedures of Examples 1 (compounds) and Example 2 (dispersions), using DESMODUR N-100 isocyanate, one or more compounds of Formula (Ia), and at least one additional reagent as described in Table 18. The additional reagents were added to the reaction after the initial compound of Formula (Ia) and isocyanate had reacted for 1 hour, and the reaction mixture was heated at 80° C. for an additional four hours. Examples 111 to 114 were applied as dispersions to textiles at 60 g/L, and tested according to the test methods described above.

Examples 115 to 117

Examples 115 to 117 follow the procedure of Example 65, using DESMODUR N-100 isocyanate, one or more compounds of Formula (Ia), and at least one additional reagent as described in Table 18. The additional reagents were added to the reaction after the initial compound of Formula (Ia) and isocyanate had reacted for 6 hours, and the reaction mixture was heated at 80° C. overnight. Examples 115 to 117 were applied as dispersions to textiles at 60 g/L, and tested according to the test methods described above.

TABLE 18

Compositions of Examples 111 to 117

| | Component (a) Desmodur N100 (g) | Component (b) Sorbitan tristearate (g) | Sorbitan monostearate (g) | Component (c) Compound(s) | Amount(s) (g) |
|---|---|---|---|---|---|
| Ex. 111 | 30.0 | 108.29 | | betaine HCl | 1.21 |
| Ex. 112 | 30.49 | 73.24 | 1.4 | stearyl alcohol | 13.49 |
| Ex. 113 | 30.11 | 102.59 | | betaine HCl | 2.41 |
| Ex. 114 | 30.25 | 100.19 | | butanone oxime | 0.75 |
| Ex. 115 | 1.9 | 5.6 | 0 | N,N-dimethylaminoethanol | 0.04 |
| Ex. 116 | 1.5 | 5.98 | | diisopropylamine | 0.04 |
| Ex. 117 | 1.5 | 3.15 | | diisopropylamine | 0.4 |

TABLE 19

Performance Data of Examples 111 to 117

|  | Cotton | | Polyester | |
| --- | --- | --- | --- | --- |
|  | Water Drop | Spray | Water Drop | Spray |
| Ex. 111 | 3 | 85 | 3 | 100 |
| Ex. 112 | 3 | 80 | 3 | 100 |
| Ex. 113 | 3 | 85 | 3 | 100 |
| Ex. 114 | 4 | 90 | 4 | 90 |
| Ex. 115 | 3 | 100 | 3 | 100 |
| Ex. 116 | 3 | 75 | 3 | 90 |
| Ex. 117 | 3 | 85 | 3 | 85 |

Example 118

Example 118 follows the procedures of Examples 1 (compounds) and Example 2 (dispersions), reacting DESMODUR N-100 isocyanate with sorbitan tristearate according to Table 20, and incorporating sodium carbonate as a co-catalyst (0.375 g) during reaction. Example 118 was applied as dispersions to textiles at 60 g/L, and tested according to the test methods described above.

Examples 119 and 120

Examples 119 and 120 follow the procedure of Example 65, using DESMODUR N-100 isocyanate, sorbitan tristearate, and lauric acid as described in Table 20. The lauric acid was added to the reaction after the initial compound of Formula (Ia) and isocyanate had reacted for 6 hours, and the reaction mixture was heated at 80° C. overnight. Examples 119 and 120 were applied as dispersions to textiles at 100 g/L, and tested according to the test methods described above.

TABLE 20

Compositions of Examples 118 to 120

|  | Component (a) | Component (b) | | Component (c) |
| --- | --- | --- | --- | --- |
|  | Desmodur N100 (g) | Compound | Amount (g) | Lauric acid (g) |
| Ex. 118 | 15.0 | sorbitan tristearate | 59.87 |  |
| Ex. 119 | 1.5 | sorbitan tristearate | 5.68 | 0.08 |
| Ex. 120 | 2.2 | sorbitan tristearate | 5.95 | 0.68 |

TABLE 21

Performance Data of Examples 118 to 120

|  | Cotton | | Polyester | |
| --- | --- | --- | --- | --- |
|  | Water Drop | Spray | Water Drop | Spray |
| Ex. 118 | 3 | 100 | 3 | 100 |
| Ex. 119 | 3 | 80 | 3 | 90 |
| Ex. 120 | 2 | 70 | 2 | 90 |

Examples 121 to 124

Examples 121 to 124 follow the procedure of Example 65, using DESMODUR N-100 isocyanate, sorbitan tristearate, and an additional reagent as described in Table 22. The additional reagent was added to the reaction after the sorbitan tristearate and isocyanate had reacted for 6 hours, and the reaction mixture was heated at 80° C. overnight. Examples 121 to 124 were applied as dispersions to textiles at 60 g/L, and tested according to the test methods described above.

TABLE 22

Compositions of Examples 121 to 124

|  | Component (a) | Component (b) | Component (c) | |
| --- | --- | --- | --- | --- |
|  | Desmodur N100 (g) | sorbitan tristearate (g) | dodecane mercaptan (g) | 3-mercapto-propionic acid (g) |
| Ex. 121 | 1.5 | 6.0 | 0.08 | 0 |
| Ex. 122 | 1.5 | 3.2 | 0.78 | 0 |
| Ex. 123 | 1.5 | 6.0 | 0 | 0.05 |
| Ex. 124 | 1.5 | 3.2 | 0 | 0.41 |

TABLE 23

Performance Data of Examples 122 to 125

|  | Cotton | | Polyester | |
| --- | --- | --- | --- | --- |
|  | Water Drop | Spray | Water Drop | Spray |
| Ex. 121 | 3 | 90 | 3 | 100 |
| Ex. 122 | 3 | 80 | 3 | 85 |
| Ex. 123 | 4 | 75 | 3 | 100 |
| Ex. 124 | 4 | 85 | 3 | 90 |

Examples 125 to 131

Examples 125 to 131 follow the procedure of Example 65, using DESMODUR N-100 isocyanate, sorbitan tristearate, and an additional reagent as described in Table 24. The additional reagent was added to the reaction after the sorbitan tristearate and isocyanate had reacted for 6 hours, and the reaction mixture was heated at 80° C. overnight. For examples 130 to 132, sodium carbonate (0.075 g) was included during the reaction of isocyanate and sorbitan tristearate. Examples 125 to 131 were applied as dispersions to textiles at 60 g/L (Examples 125 to 128) or 100 g/L (Examples 129 to 131), and tested according to the test methods described above.

Example 132

Example 132 follows the procedures of Examples 1 (compounds) and Example 2 (dispersions), using DESMODUR N-3300 isocyanate, two compounds of Formula (Ia), and a C18 diglyceride as described in Table 24. The C18 diglyceride and sorbitan monostearate were added to the reaction after the initial compound of Formula (Ia) and isocyanate had reacted for 1 hour, and the reaction mixture was heated at 80° C. for an additional four hours. Example 132 were applied as dispersions to textiles at 60 g/L, and tested according to the test methods described above.

TABLE 24

Compositions of Examples 125 to 132

| | Component (a) | | Component (b) | | Component (c) | |
|---|---|---|---|---|---|---|
| | Desmodur N100 (g) | Desmodur N3300 (g) | Compound(s) | Amount(s) (g) | Compound(s) | Amount(s) (g) |
| Ex. 125 | 1.5 | 0 | sorbitan tristearate | 6.0 | triglycerol monostearate | 0.05 |
| Ex. 126 | 1.5 | 0 | sorbitan tristearate | 3.15 | triglycerol monostearate | 0.5 |
| Ex. 127 | 1.5 | 0 | sorbitan tristearate | 6.0 | Hexaglycerol distearate | 0.07 |
| Ex. 128 | 1.5 | 0 | sorbitan tristearate | 3.15 | Hexaglycerol distearate | 0.65 |
| Ex. 129 | 1.5 | 0 | sorbitan tristearate | 5.55 | decaglyceryl mono(caprylate/caprate) | 0.38 |
| Ex. 130 | 1.6 | 0 | sorbitan tristearate | 4.67 | decaglyceryl mono(caprylate/caprate) | 1.58 |
| Ex. 131 | 1.5 | 0 | sorbitan tristearate | 5.56 | Polyglycerol-3 | 0.21 |
| Ex. 132 | 15.0 | 0 | sorbitan tristearate/sorbitan monostearate | 48.08/1.35 | Glycerol distearate | 12.69 |

TABLE 25

Performance Data of Examples 126 to 133

| | Cotton | | Polyester | |
|---|---|---|---|---|
| | Water Drop | Spray | Water Drop | Spray |
| Ex. 125 | 3 | 85 | 3 | 90 |
| Ex. 126 | 3 | 85 | 3 | 90 |
| Ex. 127 | 3 | 85 | 3 | 90 |
| Ex. 128 | 3 | 75 | 3 | 85 |
| Ex. 129 | 3 | 80 | 3 | 90 |
| Ex. 130 | 3 | 70 | 3 | 70 |
| Ex. 131 | 3 | 70 | 3 | 95 |
| Ex. 132 | 4 | 80 | 3 | 85 |

What is claimed is:

1. A composition comprising an organic solution or aqueous dispersion of a compound having no unreacted isocyanate groups, said compound prepared by the process comprising:
(i) reacting (a) at least one isocyanate group-containing compound selected from isocyanate, diisocyanate, polyisocyanate, or mixture thereof, and (b) at least one isocyanate-reactive compound selected from formula (Ia) or (Ib):

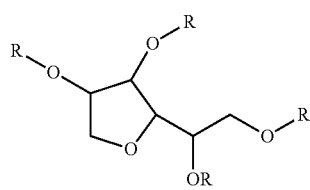

(Ia)

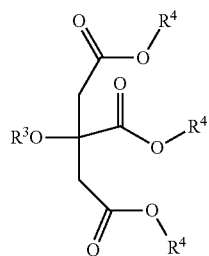

(Ib)

wherein each R is independently a —H; —$R^1$; —C(O)$R^1$; —(CH$_2$CH$_2$O)$_n$(CH(CH$_3$)CH$_2$O)$_m$$R^2$;

or —(CH$_2$CH$_2$O)$_n$(CH(CH$_3$)CH$_2$)$_m$C(O)$R^1$;

each n is independently 0 to 20;

each m is independently 0 to 20;

m+n is greater than 0;

each $R^1$ is independently a linear or branched alkyl group having 5 to 29 carbons optionally comprising at least 1 unsaturated bond;

each $R^2$ is independently —H, or a linear or branched alkyl group having 6 to 30 carbons optionally comprising at least 1 unsaturated bond;

or a mixtures thereof, provided that when the compound is of Formula (Ia) then at least one of R or $R^2$ is —H and at least two of R are chosen from —C(O)$R^1$; —(CH$_2$CH$_2$O)$_n$(CH(CH$_3$)CH$_2$O)$_m$$R^2$;

or —(CH$_2$CH$_2$O)$_n$(CH(CH$_3$)CH$_2$O)$_m$'C(O)$R^1$;

each $R^3$ is independently a —H; —$R^1$; —C(O)$R^1$; —(CH$_2$CH$_2$O)$_n$(CH(CH$_3$)CH$_2$O)$_m$$R^2$;

or —(CH$_2$CH$_2$O)$_n$(CH(CH$_3$)CH$_2$)$_m$C(O)$R^1$;

each $R^4$ is independently —H, a linear or branched alkyl group having 6 to 30 carbons optionally comprising at least 1 unsaturated bond, or combinations thereof; —(CH$_2$CH$_2$O)$_n$(CH(CH$_3$)CH$_2$O)$_m$$R^2$;

or —(CH$_2$CH$_2$O)$_n$(CH(CH$_3$)CH$_2$O)$_m$C(O)$R^1$;

each n' is independently 0 to 20;

each m' is independently 0 to 20;

m'+n' is greater than 0; and provided when the compound is Formula (Ib), then the compound is mono-substituted, di-substituted, or tri-substituted with alkyl groups, and at least one $R^2$, $R^3$ or $R^4$ is a —H.

2. The composition of claim 1 wherein the compounds of formula (Ia) or (Ib) are at least 50% bio-based derived.

3. The composition of claim 1 wherein the compounds of formula (Ia) or (Ib) are 100% bio-based derived.

4. The composition of claim 1 wherein the diioscyanate or polyisocyanate is selected from the group consisting of hexamethylene diisocyanate homopolymer, 3-isocyanatomethyl-3,4,4-trimethylcyclohexyl isocyanate, bis-(4-isocyanatocylohexyl)methane and diisocyanate trimers of formulas (IIa), (IIb), (IIc) and (IId):

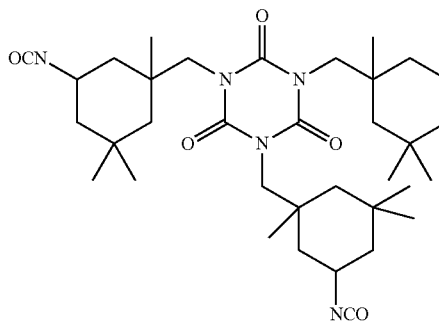
(IIa)

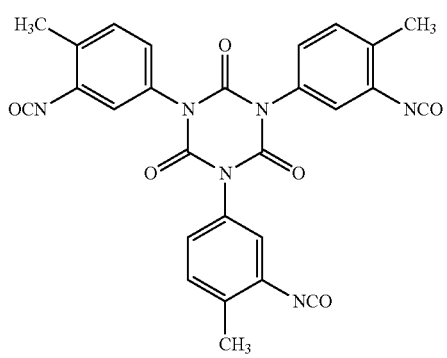
(IIb)

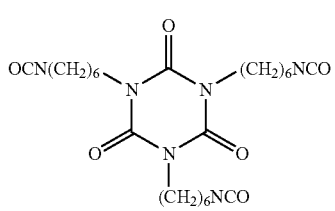
(IIc)

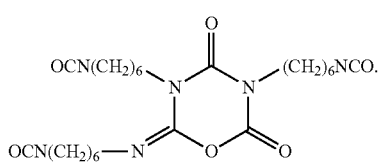
(IId)

5. The composition of claim 1, wherein step (i) further comprises reacting (c) at least one second compound selected from water, at least one organic compound of Formula (IIIa)

$$R^5\text{—}X \quad \quad (\text{IIIa}),$$

at least one organic compound of Formula (IIIb)

$$R^{15}\text{—}(OCH_2CH(OR^{16})CH_2)_z\text{—}OR^{17} \quad (\text{IIIb}),$$

or mixtures thereof; wherein $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy- or amine-functional linear or branched organosiloxane, a thiol-functional $C_1$ to $C_{30}$ linear or branched alkyl, an amine-functional $C_1$ to $C_{30}$ linear or branched alkyl,

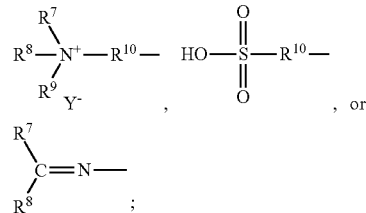
, or

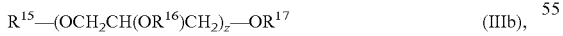
;

wherein $R^7$, $R^8$, and $R^9$ are each independently, —H, —$C_1$ to $C_6$ alkyl, or combinations thereof;

$R^{10}$ is a divalent alkyl group of 1 to 20 carbons;

X is an isocyanate-reactive group selected from —OH, —C(O)OH, —SH, —NH($R^{12}$), —O—$(CH_2CH_2O)_s$ $(CH(CH_3)CH_2O)_t$—H or —[C(O)]—O—$(CH_2CH_2O)_s(CH(CH_3)CH_2O)_t$—H;

$R^{12}$ is —H or a monovalent C1 to C6 alkyl group;

$R^{15}$, $R^{16}$, and $R^{17}$ are each independently a —H; —$R^{18}$; —C(O)$R^{18}$ provided that at least one $R^{15}$, $R^{16}$, or $R^{17}$ is a —H;

$R^{18}$ is independently a linear or branched alkyl group having 5 to 29 carbons optionally comprising at least 1 unsaturated bond;

z is 1 to 15;

Y is —Cl;

s is an integer of 0 to 50;

t is an integer of 0 to 50; and s+t is greater than 0.

6. The composition of claim 5, wherein the second compound (c) is of Formula (IIIa), and X is —O— $(CH_2CH_2O)_s(CH(CH_3)CH_2O)_t$—H; or —[C(O)]—O— $(CH_2CH_2O)_s(CH(CH_3)CH_2O)_t$—H.

7. The composition of claim 5, wherein the second compound (c) is of Formula (IIIa), X is an isocyanate-reactive functional group selected from —OH, —C(O)OH, —SH, —NH($R^{12}$); and $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy-functional linear or branched organosiloxane, a thiol-functional $C_1$ to $C_{30}$ linear or branched alkyl, an amine-functional $C_1$ to $C_{30}$ linear or branched alkyl.

8. The composition of claim 5, wherein the second compound (c) is of Formula (IIIb).

9. The composition of claim 1 wherein (b) is at least one compound selected from formula (Ia):

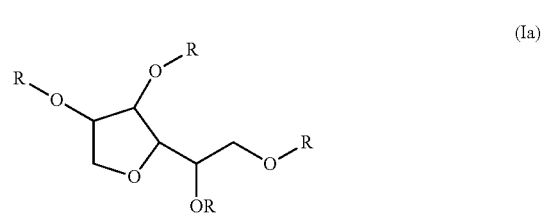
(Ia)

wherein R is independently a —H; —$R^1$; or —C(O)$R^1$.

10. The composition of claim 1 wherein (b) is at least one compound selected from formula (Ia):

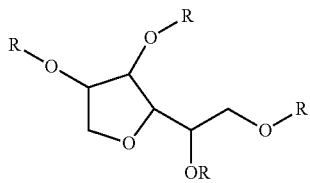

(Ia)

wherein R is independently a —H; —(CH$_2$CH$_2$O)$_n$(CH(CH$_3$)CH$_2$O)$_m$R$^2$;
or —(CH$_2$CH$_2$O)$_n$(CH(CH$_3$)CH$_2$O)$_m$C(O)R$^1$.

11. The composition of claim 1 wherein (b) is at least one compound selected from formula (Ib):

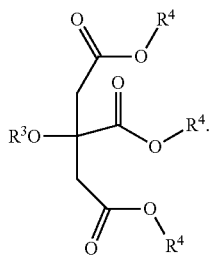

(Ib)

12. A method of preparing an organic solution or aqueous composition of a compound having no unreacted isocyanate groups comprising:
   (i) reacting (a) at least one isocyanate group-containing compound selected from isocyanate, diisocyanate, polyisocyanate, or mixture thereof, and (b) at least one isocyanate-reactive compound selected from formula (Ia) or (Ib):

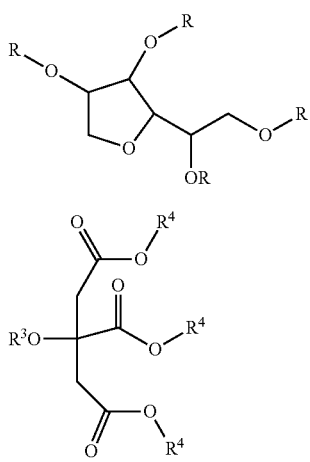

(Ia)

(Ib)

wherein each R is independently a —H; —R$^1$; —C(O)R$^1$; —(CH$_2$CH$_2$O)$_n$(CH(CH$_3$)CH$_2$O)$_m$R$^2$;
or —(CH$_2$CH$_2$O)$_n$(CH(CH$_3$)CH$_2$O)$_m$C(O)R$^1$;
each n is independently 0 to 20;
each m is independently 0 to 20;
m+n is greater than 0;
each R$^1$ is independently a linear or branched alkyl group having 5 to 29 carbons optionally comprising at least 1 unsaturated bond;
each R$^2$ is independently —H, or a linear or branched alkyl group having 6 to 30 carbons optionally comprising at least 1 unsaturated bond;
or a mixtures thereof,
provided that when the compound is of Formula (Ia) then at least one of R or R$^2$ is —H and at least two of R are chosen from —C(O)R$^1$; —(CH$_2$CH$_2$O)$_n$(CH(CH$_3$)CH$_2$O)$_m$R$^2$;
or —(CH$_2$CH$_2$O)$_n'$(CH(CH$_3$)CH$_2$O)$_m'$C(O)R$^1$;
each R$^3$ is independently a —H; —R$^1$; —C(O)R$^1$; —(CH$_2$CH$_2$O)$_{n'}$(CH(CH$_3$)CH$_2$O)$_{m'}$R$^2$;
or —(CH$_2$CH$_2$O)$_{n'}$(CH(CH$_3$)CH$_2$)$_{m'}$C(O)R$^1$;
each R$^4$ is independently —H, a linear or branched alkyl group having 6 to 30 carbons optionally comprising at least 1 unsaturated bond, or combinations thereof; —(CH$_2$CH$_2$O)$_{n'}$(CH(CH$_3$)CH$_2$O)$_{m'}$R$^2$;
or —(CH$_2$CH$_2$O)$_{n'}$(CH(CH$_3$)CH$_2$O)$_{m'}$C(O)R$^1$;
each n' is independently 0 to 20;
each m' is independently 0 to 20;
m'+n' is greater than 0; and
provided when the compound is Formula (Ib), then the compound is mono-substituted, di-substituted, or tri-substituted with alkyl groups, and at least one R$^2$, R$^3$ or R$^4$ is a —H.

13. A method of treating a fibrous substrate comprising applying to the surface of the substrate an aqueous composition comprising a compound having no unreacted isocyanate groups, said compound prepared by:
   (i) reacting (a) at least one isocyanate group-containing compound selected from isocyanate, diisocyanate, polyisocyanate, or mixture thereof, and (b) at least one isocyanate-reactive compound selected from formula (Ia) or (Ib):

or a mixtures thereof, provided that when the compound is of Formula (Ia) then at least one of R or $R^2$ is —H and at least two of R are chosen from —C(O)$R^1$; —(CH$_2$CH$_2$O)$_{n'}$(CH(CH$_3$)CH$_2$O)$_{m'}R^2$;

or —(CH$_2$CH$_2$O)$_{n'}$(CH(CH$_3$)CH$_2$O)$_{m'}$C(O)$R^1$;

each $R^3$ is independently a —H; —$R^1$; —C(O)$R^1$; —(CH$_2$CH$_2$O)$_{n'}$(CH(CH$_3$)CH$_2$O)$_{m'}R^2$;

or —(CH$_2$CH$_2$O)$_{n'}$(CH(CH$_3$)CH$_2$)$_{m'}$C(O)$R^1$;

each $R^4$ is independently —H, a linear or branched alkyl group having 6 to 30 carbons optionally comprising at least 1 unsaturated bond, or combinations thereof; —(CH$_2$CH$_2$O)$_{n'}$(CH(CH$_3$)CH$_2$O)$_{m'}R^2$;

or —(CH$_2$CH$_2$O)$_{n'}$(CH(CH$_3$)CH$_2$)$_{m'}$C(O)$R^1$;

each n' is independently 0 to 20;

each m' is independently 0 to 20;

m'+n' is greater than 0; and provided when the compound is Formula (Ib), then the compound is mono-substituted, di-substituted, or tri-substituted with alkyl groups, and at least one $R^2$, $R^3$ or $R^4$ is a —H.

14. The method of claim 13, wherein the compound is prepared by further reacting (c) at least one second compound selected from water, at least one organic compound of formula (III)

$$R^5-X \quad (IIIa),$$

at least one organic compound of Formula (IIIb)

$$R^{15}-(OCH_2CH(OR^{16})CH_2)_z-OR^{17} \quad (IIIb),$$

or mixtures thereof; wherein $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy- or amine-functional linear or branched organosiloxane, a thiol-functional $C_1$ to $C_{30}$ linear or branched alkyl, an amine-functional $C_1$ to $C_{30}$ linear or branched alkyl,

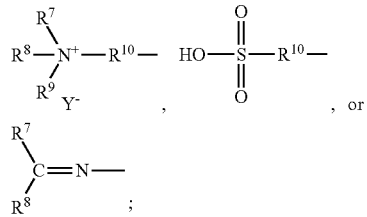

wherein $R^7$, $R^8$, and $R^9$ are each independently, —H, —$C_1$ to $C_6$ alkyl, or combinations thereof;

$R^{10}$ is a divalent alkyl group of 1 to 20 carbons;

X is an isocyanate-reactive functional group selected from —OH, —C(O)OH, —SH, —NH($R^{12}$), —O—(CH$_2$CH$_2$O)$_s$(CH(CH$_3$)CH$_2$O)$_t$—H or —[C(O)]—O—(CH$_2$CH$_2$O)$_s$(CH(CH$_3$)CH$_2$O)$_t$—H;

$R^{12}$ is —H or a monovalent $C_1$ to $C_6$ alkyl group;

$R^{15}$, $R^{16}$, and $R^{17}$ are each independently a —H; —$R^{18}$; —C(O)$R^{18}$ provided that at least one $R^{15}$, $R^{16}$, or $R^{17}$ is a —H;

$R^{18}$ is independently a linear or branched alkyl group having 5 to 29 carbons optionally comprising at least 1 unsaturated bond;

z is 1 to 15;

Y is —Cl;

s is an integer of 0 to 50;

t is an integer of 0 to 50;

s+t is greater than 0.

15. The method of claim 13 wherein the contacting is by exhaustion, foam, flex-nip, nip, pad, kiss-roll, beck, skein, winch, liquid injection, overflow flood, roll, brush, roller, spray, dipping or immersion.

16. A substrate treated according to the method of claim 13.

17. The substrate of claim 16 which is a fiber, yarn, fabric, fabric blend, textile, spunlaced nonwoven, carpet, paper or leather of cotton, cellulose, wool, silk, rayon, nylon, aramid, acetate, acrylic, jute, sisal, sea grass, coir, polyamide, polyester, polyolefin, polyacrylonitrile, polypropylene, polyaramid, or blends thereof.

* * * * *